US010745129B2

(12) United States Patent
Near

(10) Patent No.: US 10,745,129 B2
(45) Date of Patent: Aug. 18, 2020

(54) MULTIROTOR VEHICLE

(71) Applicant: Cyborg, Inc., Concord, NH (US)

(72) Inventor: Timothy James Near, Concord, NH (US)

(73) Assignee: Timothy J. Near, Manchester, NH (US)

( * ) Notice: Subject to any disclaimer, the term of this patent is extended or adjusted under 35 U.S.C. 154(b) by 356 days.

(21) Appl. No.: 15/964,787

(22) Filed: Apr. 27, 2018

(65) Prior Publication Data

US 2018/0312257 A1 Nov. 1, 2018

Related U.S. Application Data

(60) Provisional application No. 62/490,650, filed on Apr. 27, 2017, provisional application No. 62/581,347, filed on Nov. 3, 2017.

(51) Int. Cl.
*B64C 39/02* (2006.01)
*B64C 1/06* (2006.01)
*B64C 27/00* (2006.01)
*B64C 27/10* (2006.01)
*B64C 27/08* (2006.01)

(52) U.S. Cl.
CPC ............ *B64C 39/026* (2013.01); *B64C 1/061* (2013.01); *B64C 27/006* (2013.01); *B64C 27/08* (2013.01); *B64C 27/10* (2013.01)

(58) Field of Classification Search
CPC .................................................. B64C 39/026
See application file for complete search history.

(56) References Cited

PUBLICATIONS

Catchy Agency, "Are Wearabels the Precursor to our Cyborg Future?", retrieved online Apr. 4, 2018, from URL: https://catchyagency.com/are-wearables-the-precursor-to-our-cyborg-future/, 5 pages.
A3, "Ultimate Reliability Infinite Possibility", retrieved online Apr. 12, 2018, retrieved online URL: https://www.dji.com/a3/info#specs, 6 pages.
Wikipedia, "Electric Motor", Retrieved online Apr. 23, 2018, retrieved from URL: https://en.wikipedia.org/wiki/Electric_Motor, 38 pages.
Barclay Ballard, "Forget Wearables, Cyborg Tech is the Future", Mar. 27, 2015, retrieved online Apr. 4, 2018, URL: https://betanews.com/2015/03/27/forget-wearables-cyborg-tech-is-the-future, 4 pages.
(Continued)

*Primary Examiner* — Richard G Davis
(74) *Attorney, Agent, or Firm* — Finch & Maloney PLLC

(57) ABSTRACT

Techniques and architecture are disclosed for a multirotor vehicle having a rotor assembly with a plurality of rotors to provide upward thrust. Attached to the rotor assembly is a frame that includes a frame extension having a first end pivotally attached to the rotor assembly. The extension also includes a second end pivotally attached to a frame body. The vehicle further includes first and second actuators. The first actuator pivots the rotor assembly to position it within a horizontal plane to allow thrust generated by the rotor assembly to lift the vehicle. The second actuator pivots the rotor assembly within the horizontal plane so that thrust generated by the rotor assembly lifts the vehicle. The vehicle also includes a harness connected to the frame and configured to secure an operator's torso to the multirotor vehicle.

20 Claims, 18 Drawing Sheets

(56) References Cited

PUBLICATIONS

Fintan Corrigan, "How Do Drones Work and What is Drone Technology", posted Mar. 19, 2018, DroneZon, www.dronezon.com, 18 pages.

Wikipedia, "Multirotor", retrieved online Apr. 12, 2018, URL: https://en.wikipedia.org/wiki/multirotor, 2 pages.

Wikipedia, "Passenger Drone", Retrieved online on Apr. 12, 2018, URL: https://en.wikipedia.org/wiki/Passenger_drone, 2 pages.

"E7000 Tuned Propulsion System", DJI, Retrieved online Apr. 12, 2018, URL: https://www.dji.com/e7000/info#specs, 2 pages.

Mike Elgan, "The Apple Watch and Our Cyborg Future", May 11, 2015, retrieved online Apr. 4, 2018, URL: https://www.computerworld.com/article/2920305/wearables/the-apple-watch-and-our-cyborg-future, 6 pages.

Wikipedia, "Unmanned Aerial Vehicle", retrieved online Apr. Apr. 12, 2018, URL: https://en.wikipedia.org/wiki/Unmanned_aerial_vehicle, 19 pages.

"Will These Wearables Finally Make Us Cyborgs?", Connected Devices, Health, Jul. 22, 2016, retrieved online Apr. 4, 2018, URL: https://readwrite.com/2016/07/22/will-cyborg-nest-wearables-turn-human, 3 pages.

MULTIROTOR VEHICLE

CROSS-REFERENCE TO RELATED APPLICATIONS

This application claims the benefit of U.S. Provisional Patent Application No. 62/581,347, filed on Nov. 3, 2017, and titled Harnessed Manned-Multirotor Traversing Aid; and the benefit of U.S. Provisional Patent Application No. 62/490,650, filed on Apr. 27, 2017, and titled Harnessed Manned-Multirotor Traversing Aid, both of which are herein incorporated by reference in their entireties.

FIELD OF THE DISCLOSURE

This disclosure relates to transportation systems, and more particularly to multirotor vehicles.

BACKGROUND

Drone technologies are becoming an increasingly popular mode of personal transportation. People use drones for transport over water, through the air, and over ground. In many such cases, manned drones include a seat or platform on which the rider sits or stands to operate the drone from one location to another.

SUMMARY

One example embodiment of the present disclosure provides a multirotor vehicle including a rotor assembly including a plurality of rotors, the rotor assembly configured and arranged to provide upward thrust; a frame pivotally attached to the rotor assembly and configured to extend below the rotor assembly and along a back of an operator, the frame including a frame extension including a first end and a second end, the first end pivotally attached to the rotor assembly, and a rigid frame body pivotally attached to the second end of the frame extension, so that the rotor assembly is offset from the rigid frame body; a first actuator configured to pivot the rotor assembly relative to a vertical axis of the rigid frame body so as to position the rotor assembly within a horizontal plane to allow at least a portion of thrust generated by the rotor assembly to lift the vehicle; a second actuator configured to pivot the rotor assembly relative to the horizontal plane so that at least a portion of thrust generated by the rotor assembly lifts the vehicle; and a harness connected to the frame and configured to secure the operator's torso to the multirotor vehicle with at least three points of contact between the rigid frame body and the operator's torso. In some cases, the multirotor vehicle is configured to aid the operator in one of walking, jumping, running, climbing, ascending, and descending terrain. In other cases, thrust generated by the plurality of rotors is in a substantially vertical direction to lift at least a portion of mass of the operator. In yet other cases, the first actuator is configured to rotate the frame extension from 135 degrees to 225 degrees relative to the vertical axis of the rigid frame body. In addition, in some cases the second actuator is configured to rotate the rotor assembly between 35 degrees and 160 degrees relative to the horizontal plane. In yet other cases, the rotor assembly is attached to the frame along an axis coincident with a center gravity of the multirotor vehicle. In some cases, the plurality of rotors includes at least three or more rotors. In some other cases the plurality of rotors includes a first subgroup of rotors and a second subgroup of rotors, the first subgroup being positioned within a first horizontal plane, and the second subgroup positioned within a second horizontal plane different from the first horizontal plane. In yet other cases, the frame extension includes a curved frame body so that the first end of the frame extension is positioned vertically higher than the second end. In some cases, the multirotor vehicle is secured to the operator such that legs of the operator are unencumbered by the multirotor vehicle so that thrust from the vehicle aids in movement of the operator along ground terrain while using legs of the operator. In other cases, the frame is configured to extend from a lower back and along the torso of the operator to above a head of the operator. In yet other cases, the multirotor vehicle further includes a control system configured to operate the plurality of rotors independently from one another to move the multirotor vehicle. In some such cases, the control system further comprises at least one inertial measurement unit, the inertial measurement unit configured to measure roll, pitch, and yaw of the multirotor vehicle.

Another example embodiment of the present disclosure provides a multirotor vehicle including a rotor assembly including a plurality of rotors, the rotor assembly configured and arranged to provide upward thrust; a frame pivotally attached to the rotor assembly and configured to extend below the rotor assembly and along a back of an operator, the frame including a frame extension including a first end and a second end, the first end pivotally attached to the rotor assembly, and a rigid frame body pivotally attached to the second end of the frame extension, so that the rotor assembly is offset from the rigid frame body; a first actuator configured to pivot the rotor assembly about a vertical axis of the rigid frame body so as to position the rotor assembly within a horizontal plane to allow a substantial portion of thrust generated by the rotor assembly to lift the vehicle; a second actuator configured to pivot the rotor assembly about a horizontal axis so that a substantial portion of thrust generated by the rotor assembly lifts the vehicle; an inertial sensor configured to measure changes in position of the multirotor vehicle, a processor communicatively coupled to the inertial sensor and configured to operate the first and second actuators to position of the rotor assembly to provide thrust in a direction normal to the horizontal plane in response to measurements of the inertial sensor; and a harness connected to the frame and configured to secure the operator to the multirotor vehicle so that legs of the operator are unencumbered by the multirotor vehicle to allow the multirotor vehicle to aid in movement of the operator along ground terrain using legs of the operator. In some instances, the rotor assembly further includes at least one vent attached thereto, the at least one vent configured to change a direction of air flow from at least one rotor to generate thrust. In other instances, the rotors rotate independently from one another so that at least one rotor is configured to provide thrust predominantly in a horizontal direction and at least one other rotor is configured to provide thrust predominantly in a vertical direction. In yet other instances, one of the frame and rotor assembly includes a plurality of light sources to indicate one of direction, battery power, and operational mode of the multirotor vehicle. In some instances, the multirotor vehicle further includes a control system, the control system including a first operational mode, the first operational mode configured to operate the multirotor vehicle independently from the operator so that the multirotor vehicle hovers in place to enable the operator to attach the harness to the frame.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

Figure 1A:
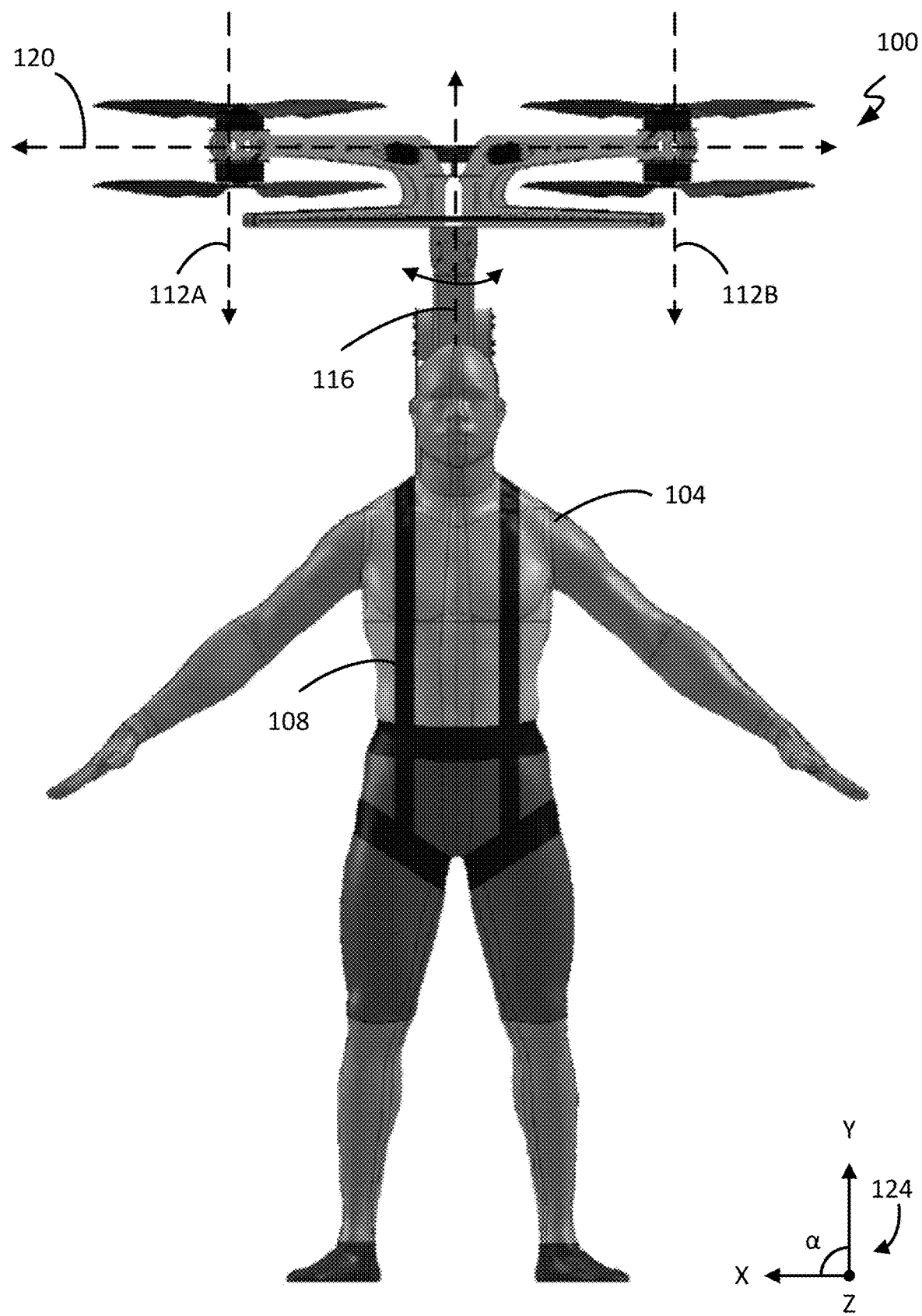
FIG. 1A is a front view of a multirotor vehicle and an operator, configured in accordance with an embodiment of the present disclosure.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

Techniques and architecture are disclosed for a multirotor vehicle useful as a traversing aid, and in particular to facilitate movement of an operator attached thereto. The multirotor vehicle can be worn by the operator so that thrust generated by the vehicle can assist the operator with performing physical activities, such as walking, running, climbing or ascending and descending, to name just a few. The vehicle includes a rotor assembly with a plurality of rotors (e.g., three or more rotors) to provide upward thrust so as to lift or otherwise support a portion of the operator's mass while performing such activities. Attached to the rotor assembly is a frame that includes a frame extension (e.g., an arm or linkage member) having a first end pivotally attached to the rotor assembly. The frame extension further includes a second end pivotally attached to a frame body. Together the frame extension and frame body form a light, ruggedized frame assembly that can be worn by the operator without encumbering legs of the operator. The vehicle also includes first and second actuators. The first actuator pivots the rotor assembly to position it to allow a substantial portion of thrust generated by the rotor assembly to lift the vehicle. The second actuator pivots the rotor assembly within the horizontal plane so that thrust generated by the rotor assembly can lift the vehicle. The vehicle also includes a harness connected to the frame and configured to secure an operator's torso to the multirotor vehicle.

General Overview

As discussed above, drone technologies are deployed as personal transportation devices to provide an alternative to conventional modes of transportation, such as bicycles, motorcycles, and automobiles, to name only a few. Many of these drone-based devices share a common feature that the operator sits down in a bucket seat, on a saddle, or other seating device. In such instances, movement of the rider's legs are restricted or otherwise inhibited by requiring the rider to remain seated. In other instances, a rider is required to stand on the drone-based device (or on a board used in conjunction with a drone) to operate it. In many such instances, a rider's hands are also utilized to establish a connection with the device (e.g., by holding a tow line) or to control the device. Thus, the rider's hands, and often times feet, are both encumbered by the device, such that the rider is not free to move and/or use them. As a result, present drone technologies are unable to assist or otherwise aid a person with activities that involve the use of a person's hands or feet, for example walking, running, and climbing. In addition, present drone technologies are also unable to enhance a person's performance during such activities because current technologies do not provide forces in a direction that oppose gravitational forces that act on a person. Devices, such as thrust belts, provide a force in the direction of movement of the person, but do not provide any forces (e.g., a lifting force) that oppose the gravitational force acting on the person. Thus, the benefits of such devices are limited because gravitational forces continue to restrict a person's ability to perform such activities.

Thus, and in accordance with an embodiment of the present disclosure, techniques and architecture are disclosed for a multirotor vehicle useful as a traversing aid, and in particular to facilitate movement of an operator attached thereto. The multirotor vehicle can be a battery powered vehicle worn by an operator so that thrust generated by the vehicle can assist the operator with performing physical activities, such as walking, running, climbing or ascending and descending, to name just a few. For example, as the operator is running, the multirotor vehicle can support a portion of the operator's mass so that the operator can experience a longer stride length than would be possible without the device. The longer stride length can allow the operator to move across longer distances, and in less time, without expending more energy and effort to do so. The multirotor vehicle, in some examples, can be configured to lift all of the operator's mass so as to fly the operator from one location to another, and thus provide a personal form of transportation.

The vehicle includes a rotor assembly with a plurality of rotors (e.g., three or more rotors) to provide upward thrust so as to lift or otherwise support a portion of the operator's mass while the operator performs physical activities. The rotors of the rotor assembly can be operated individually or collectively as a group (or subgroup) using one or more motor controllers of a control system of the vehicle. In addition, the rotors of the rotor assembly can be positioned in one or more different planes and can be arranged in a symmetric or asymmetric fashion depending on the particular use case. In some examples, the rotors can further include one or more vents to direct the thrust generated therefrom in one or more directions to assist with movement of the multirotor vehicle.

Attached to the rotor assembly is a frame that includes a frame extension (e.g., an arm or linkage member) and a frame body. Together the frame extension and frame body form a light, ruggedized frame assembly that can be worn by the operator without encumbering legs of the operator. This is particularly noteworthy because previous drone-based devices often times used a person's legs to control or otherwise engage with the device. Thus, these drone-based vehicles cannot be used by a person in activities that involve the use of the person's legs, because the person's legs are needed to operate the device. Here, the device of the present disclosure overcomes such deficiencies by providing a wearable multirotor vehicle in which an operator's legs and hands can be free to perform physical activities. The frame, in some examples, can be a foldable frame so that it can be collapsed to the size of a typical backpack to facilitate carry and transportation of the vehicle when it is not in use. In addition, the operator can be secured to the frame body using a harness that can wrap around or otherwise engage (e.g., attach to a person's clothing) the operator's torso.

The vehicle also includes first and second actuators to adjust a position of the rotor assembly so as to direct a substantial portion (if not all) the thrust generated by the assembly in a direction to provide lift. The first and second actuators can be electric rotary actuators, such as servomotors or stepper motors. The first actuator can pivot the rotor assembly to position it within a horizontal plane to allow a substantial portion of thrust generated by the rotor assembly to be used to lift the vehicle. This can be useful in instances when the operator bends forward, such as when tying a shoe or running uphill. In such instances, the operator's torso is pitched, leaned, or otherwise titled forward causing the multirotor vehicle to be positioned at an angle. Angular displacement of the vehicle can reduce its effective lift force because the thrust generated by the rotors is also at an angle. As a result, a vertical component of the angled thrust force, that is something less than the total thrust produced, provides lift. To ensure that thrust from the rotors is in a direction to provide lift, the control system of the vehicle is configured rotate the frame extension so that the rotor assembly is substantially level or otherwise not angled so that thrust is directed in a vertical direction. To this end, the vehicle may include sensors (e.g., accelerometers and gyroscopes) that can measure an orientation of the vehicle and provide that data to the control system. In turn, processors of the control system can analyze the recorded measurements and generate commands to adjust the position of the rotor assembly so that the assembly provides a maximum amount of lift to the operator.

The multirotor vehicle also includes a second actuator that can pivot the rotor assembly within the horizontal plane so that a substantial portion of thrust generated by the rotor assembly is used to lift the vehicle. In many instances when a person performs physical activities the person's torso can be bent, tilted, or otherwise twisted to one side or the other. Such angular displacement of the torso can cause the rotor assembly to tilt or otherwise lean to one side, and in turn change the direction of thrust of the vehicle and thereby reduce the lift generated by the vehicle. To prevent such reductions in lift, the multirotor vehicle is configured to identify angular displacements of the rotor assembly and adjust position the assembly to a level or non-tilted position. In particular, the control system can analyze sensor data and command the second actuator to rotate the rotor assembly such that the assembly is no longer at an angle relative to the horizontal plane. Thus, together the first and second actuators work together to ensure that the rotor assembly is configured to provide thrust that best supports or enhances the operator's ability to perform physical activities.

Example Multirotor Vehicle Application

Figure 1B:
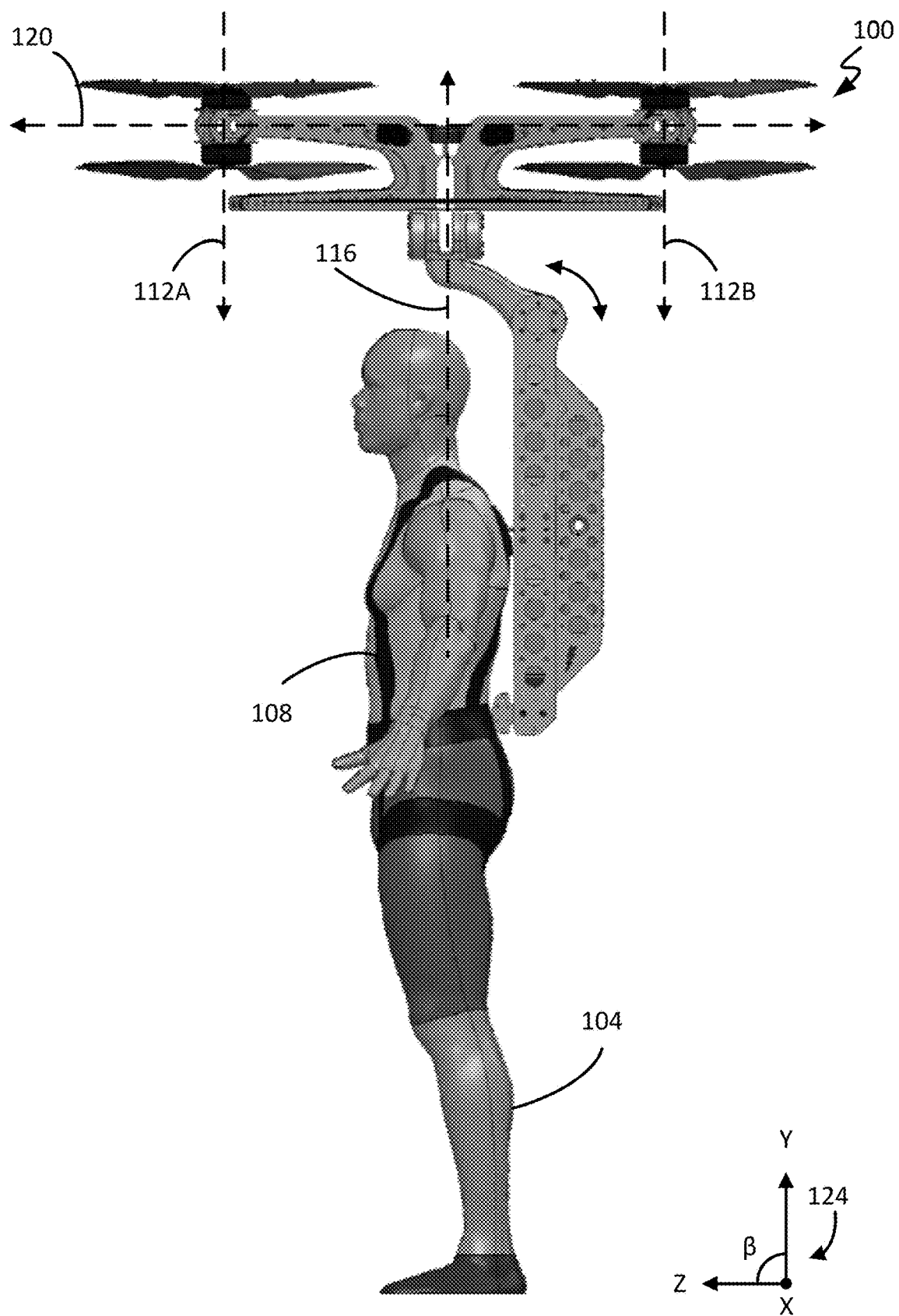
FIG. 1B is a side view of the multirotor vehicle and the operator shown in FIG. 1A, configured in accordance with an embodiment of the present disclosure.

FIG. 1A is a front view of a multirotor vehicle 100 and an operator 104, configured in accordance with an embodiment of the present disclosure. FIG. 1B is a side view of a multirotor vehicle 100 and the operator 104. As discussed above, there is a need for devices that can aid in a person's movement while the person performs activities, such as walking, running, and climbing, which involve the use of hands and/or feet. The devices of the present disclosure address this need by providing a multirotor vehicle 100 that can be worn by a person so that the operator's hands and/or legs are not encumbered by the vehicle (e.g., they are not used to engage, operate or otherwise control the vehicle). In addition, the configuration of the multirotor vehicle 100 allows movement of the operator 104 to be substantially consistent with that of the vehicle 100. To this end, the operator 104 can experience changes in thrust direction as directed by the vehicle 100.

In an example embodiment, the multirotor vehicle 100, as shown in FIGS. 1A and 1B, is can be worn by the operator 104 using a harness 108. As can be seen, vehicle 100 is attached to a back of the operator 104 with the harness 108 installed on the operator's body and attached securely to the frame, for example with flexible straps. The legs and hands of the operator 104 are free move about, and thus can be used to perform physical activities, such as walking, climbing, or ascending to name only a few. In addition, the multirotor vehicle 100 disclosed herein can enhance movements of the operator 104 during such activities by providing directional vectoring thrust and thrust in a direction opposite of that of gravity to assist with physical movement of the operator 104. Directionally vectoring thrust allows the operator 104 to traverse ground terrain or structures more easily. Examples of traversing include but are not limited to walking, running, ascending, climbing, jumping, and flying. In operation, the multirotor vehicle 100 can lift the operator 104 so that the operator can walk or run with a greater stride length, jump higher, ascend hills, towers, or objects more quickly than a person simply using one's own physical abilities. In some instances, the multirotor vehicle 100 can allow the operator 104 to perform movements not physically possible, such as flying.

To enhance the physical abilities of the operator 104, the multirotor vehicle 100 is configured to provide thrust so as to lift some or all of the combined weight (or mass) of the vehicle 100. In turn, the operator 104 can more easily and efficiently move over terrain. As can be seen, the multirotor vehicle 100 can include thrust axes 112A-D (collectively 112) along which a thrust is generated to lift some or all of the mass of the vehicle 100 (including the operator 104). Some or all of the thrust generated by the rotor assembly 208 can be along a y-axis of coordinate system 124 to generate lift, as shown. In particular, in some cases, a substantial portion of the thrust from the rotor assembly 208, such as 50, 60, 75, 85, 90, 95, 96, 97 or 98 percent, can provide lift to the vehicle to aid the operator 104. The thrust axes 112 can be parallel to one another, but this need not be the case in all instances. For instance, one or more of the thrust axes 112 can be at angle relative to the y-axis of coordinate system 124 so that a portion of the thrust aids is in a direction along a z-axis of the system 124. Thrust along the z-axis can aid in the user in moving forward or backward, depending on the use case. In other instances, the thrust axes 112 can be adjustable along the x-axis of the coordinate system 124 to assist the operator 104 with side-to-side movements. The thrust axes 112 can be adjustable in one of the x and z axes (or both) at angles relative to the y-axis in the ranges of between at least 1 degree to less than 5 degrees, 2 degrees to less than or equal to 10 degrees, and at least 5 degrees to equal to or greater than 15 degrees. In addition, the thrust axes 112 can be located about a collective center of gravity for the multirotor vehicle 100 and the operator 104, as defined by axis 116. As can be seen, the thrust axes 112 can be at locations that are symmetric about the axis 116 to lift or otherwise move the multirotor vehicle 100 in a substantially uniform fashion. In yet other cases, the thrust axes 112 can be asymmetrically located about the axis 116 to provide a non-uniform manner of thrust, depending on a given application.

In addition, the multirotor vehicle 100 can be further configured to provide thrust in a direction that provides a maximum amount of thrust to lift the combined mass of the vehicle 100 and operator 104. In particular, as the operator 104 moves over terrain, the operator's torso may bend or otherwise twist while wearing the device. Such changes in torso position can also tilt the multirotor vehicle 100 so that the thrust axes 112 no longer provide a maximum amount of lift. In other words, the vehicle 100 is positioned so that only a portion of the thrust generated by the vehicle 100 is in a direction of lift. To prevent this condition, the multirotor vehicle 100 can be configured to raise or lower a rotor assembly (as indicated by the curved arrow in FIG. 1B) so that rotor assembly 208 maintains a level or non-angled position relative to a horizontal plane 120. In addition, the multirotor vehicle 100 can be further configured to maintain the rotor assembly 208 parallel to the plane 120, so that the thrust axes 112 are substantially parallel to axis 116 despite a change in angular position of the operator's torso. In particular, the vehicle 100 can change the angular position of the rotor assembly (as shown by the curved arrow in FIG. 1A) to maintain the rotor assembly within the plane 120 despite the operator leaning to one side or the other. The operation of the multirotor vehicle 100 is to be described further herein in relation to FIGS. 8A-D.

With the rotor assembly positioned relative to plane 120, the multirotor vehicle 100 can be configured to lift the mass of the multirotor vehicle 100 and part or all of the mass of the operator 104, depending on a given application. For instance, the multirotor vehicle 100 can be configured to lift a weight of at least 40 lbs. Some of that weight can be a portion of weight from the operator 104 so that the operator 104 can now walk, run, or climb more quickly and easily. In some other instances, the multirotor vehicle 100 can provide a thrust so as to lift at least 60 lbs., at least 80 lbs., at least 100 lbs., at least 120 lbs., at least 140 lbs., at least 160 lbs., at least 180 lbs., at least 200 lbs., and at least 220 lbs. In yet other instances, the multirotor vehicle 100 can fly or otherwise lift the operator 104 from location to another so as to provide a mode of personal transportation. In such instances, the vehicle 100 can be configured to lift at least 240 lbs., at least 260 lbs., at least 280 lbs., at least 300 lbs., at least 350 lbs., at least 400 lbs., at least 450 lbs., at least 500 lbs., or more.

As can be seen, the multirotor vehicle 100 includes a harness 108 to attach the operator 104 to the vehicle 100. In general, the harness 108 securely attaches the multirotor vehicle 100 to the operator 104 so that the vehicle 100 can lift or otherwise support at least some of the mass of the operator 104 to enable the vehicle to aid or otherwise assist with operator movements. For example, the harness 108 can secure the operator's torso to the multirotor vehicle 100. Thus, limbs of the operator 104 are unencumber or otherwise restricted by the vehicle 100 so that the operator 104 can use his legs, arms, or both for traversing terrain or performing other movements. In particular, the harness 108 can be a flexible harness that is attached to the operator 104 at two or more locations on the body of the operator 104. For instance, the harness 108 can wrap around a waist and shoulders of the operator 104 to secure the operator 104 in at least three points of contact with the vehicle 100. The harness can be manufactured as single piece or made up of several pieces joined to one another, for example with sewn seams. In some examples, the harness 108 can further include rigid structures (e.g., rigid hooks) and thus can be a combination of rigid and flexible components. In particular, the harness 108 may include a rigid plate (or similar connection feature) that connects multiple portions of the harness 108 to the vehicle 100. In such instances, the multirotor vehicle 100 may include one attachment point configured to receive a back plate while the back plate can receive multiple portions of the harness 108.

The harness 108 can be attached to multirotor vehicle 100 and the operator 104 using a variety of connection devices that are either integrated into the harness 108 and/or the vehicle 100. For instance, in some examples, the harness 108 can include a quick-disconnect fastening device, such as a carabiner or the like, to attach the harness 108 to the vehicle 100. In some instances, the multirotor vehicle 100 can include tensioned compliant straps or rigid connections (or similarly non-compliant attachment devices) configured to receive the harness 108. Non-compliant attachment devices may utilize pivoting features located on the multirotor vehicle 100 and/or harness 108. In addition, the harness 108 can also be attached to the operator 104, with clamps or clips incorporated into the harness 108. In some cases, the clips or clamps are adjustable in ratcheting fashion. The harness 108, in some examples, can also be attached to or otherwise integrated with the clothing of the operator 104. Numerous harness configurations will be apparent in light of the present disclosure.

Figure 2A:
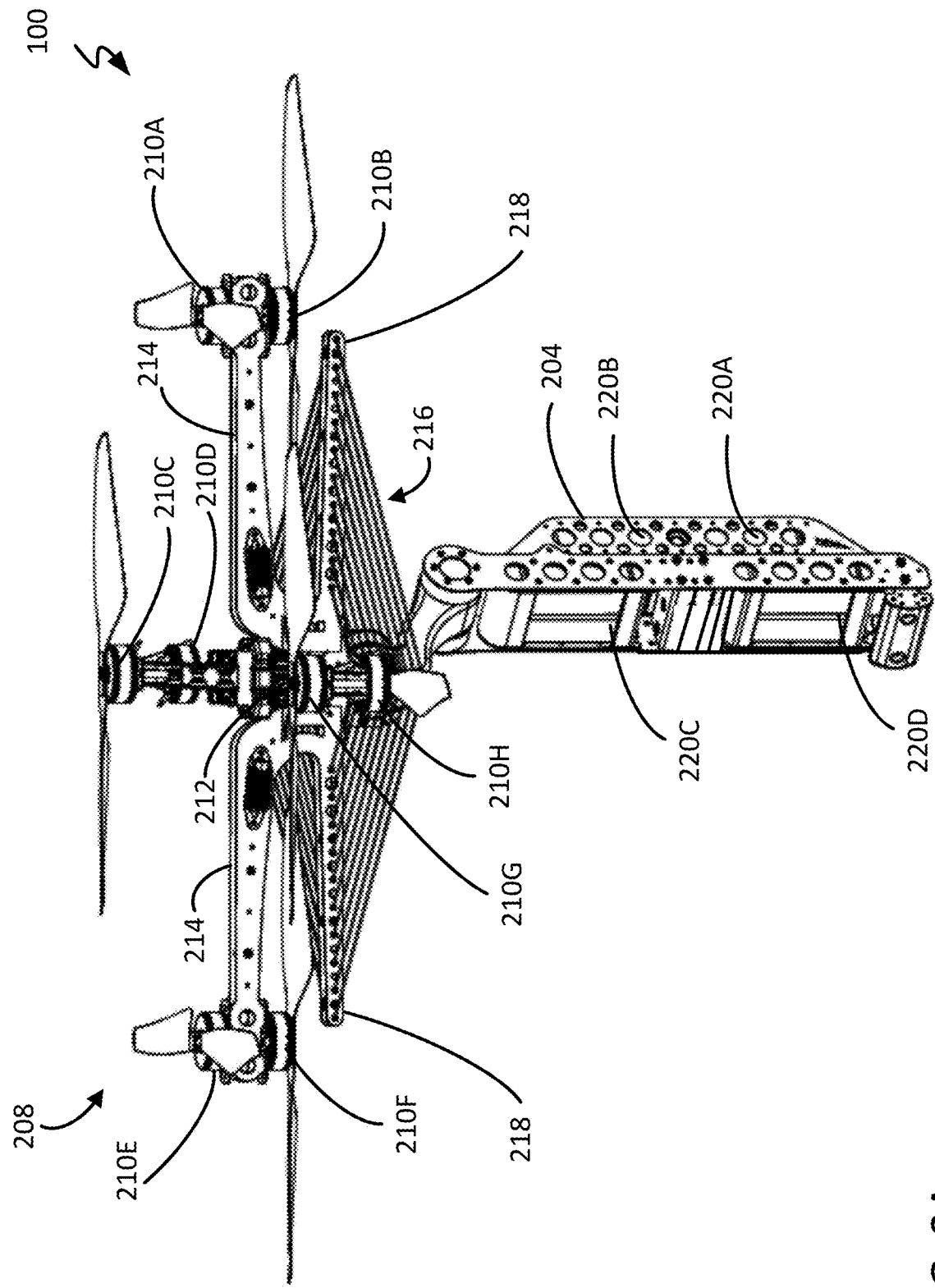
FIG. 2A is a perspective view of a multirotor vehicle shown in FIG. 1, in accordance with an embodiment of the present disclosure.
Figure 2B:
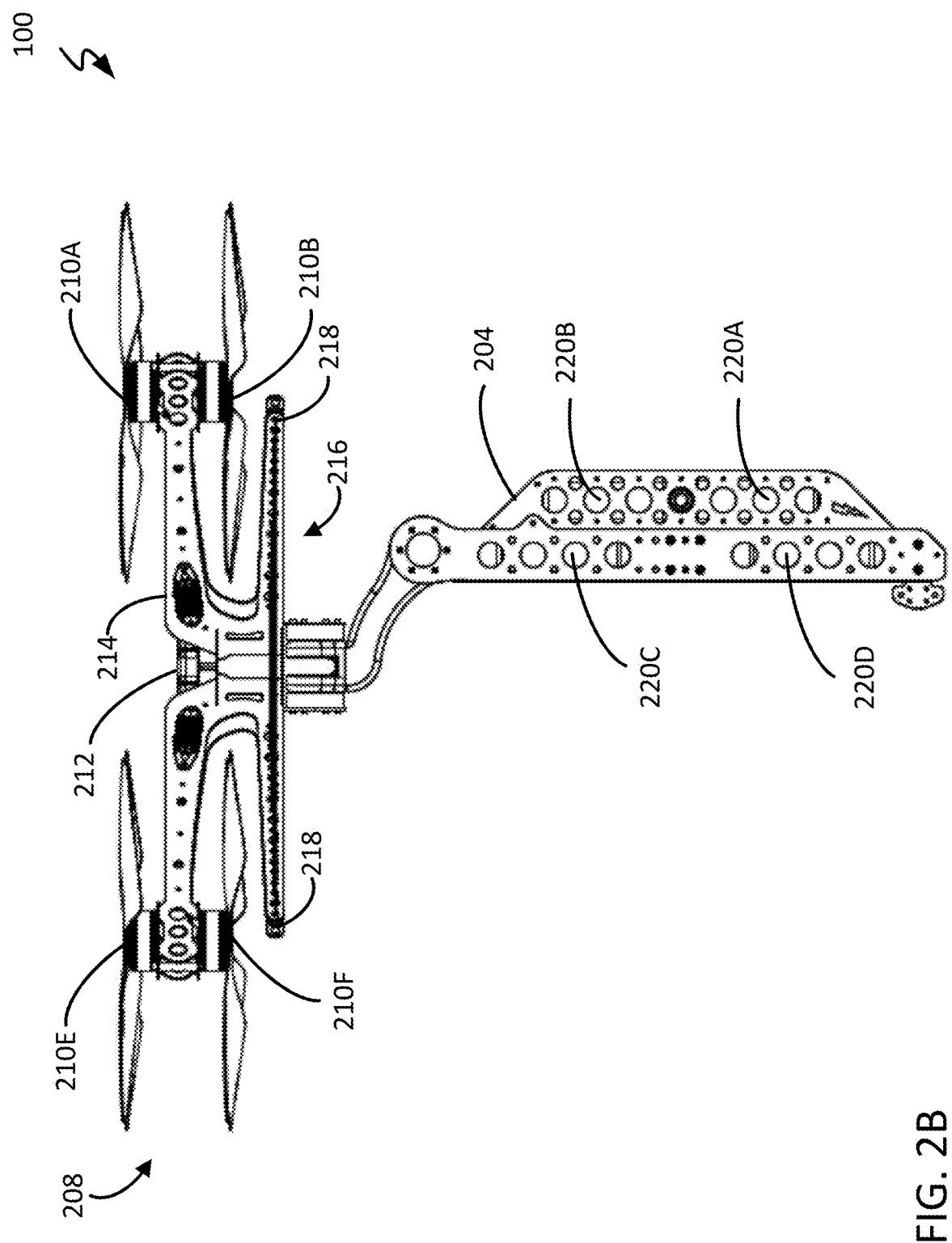
FIG. 2B is a side view of the multirotor vehicle shown in FIG. 2A, in accordance with an embodiment of the present disclosure.
Figure 2C:
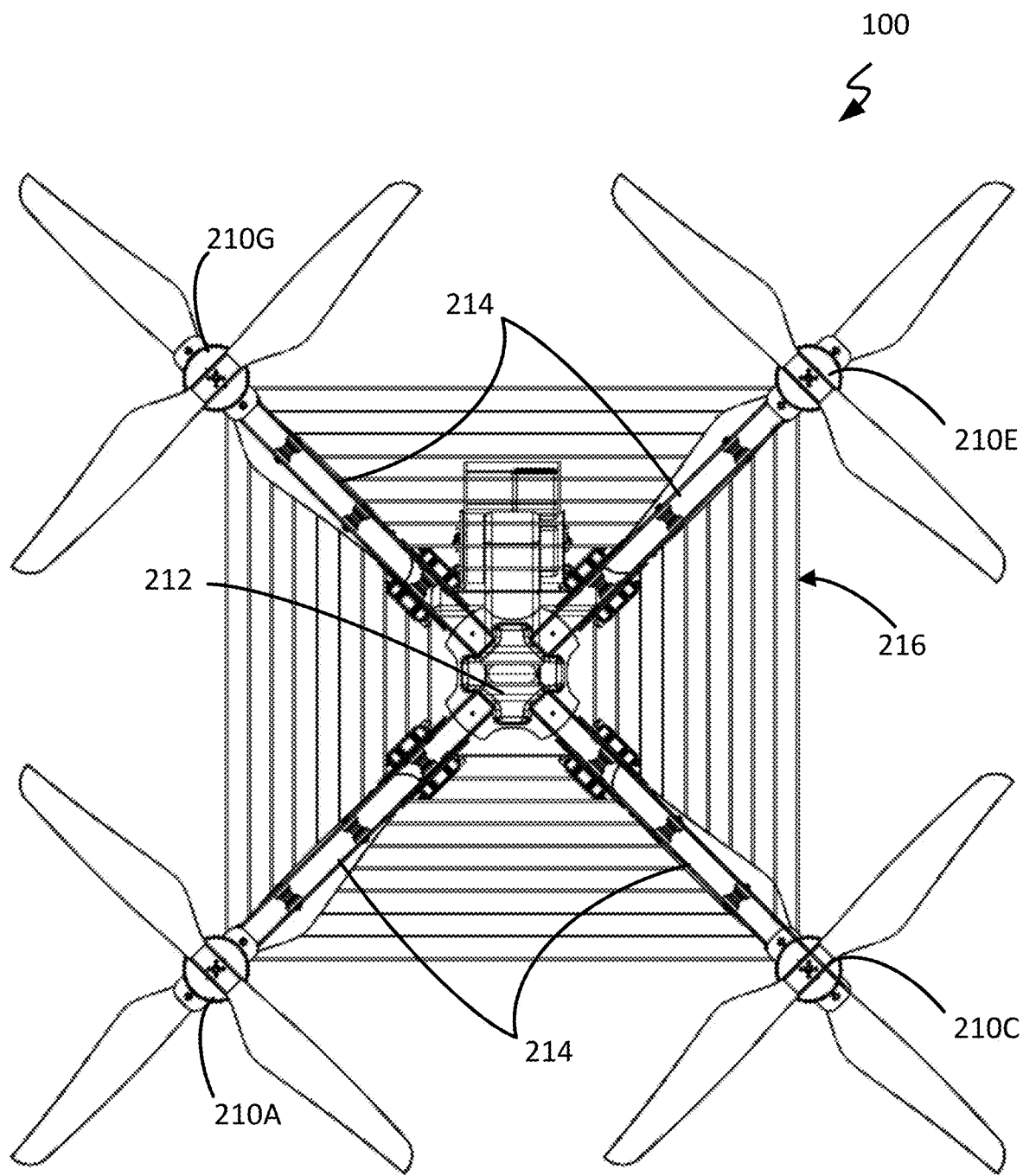
FIG. 2C is a top view of the multirotor vehicle shown in FIG. 2A, in accordance with an embodiment of the present disclosure.

FIG. 2A is a perspective view of a multirotor vehicle 100 shown in FIG. 1, in accordance with an embodiment of the present disclosure. FIG. 2B is a side view of the multirotor vehicle 100 shown in FIG. 2A. FIG. 2C is a top view of the multirotor vehicle 100 shown in FIG. 2A. In one example embodiment, the multirotor vehicle 100 can include a frame assembly 204, a rotor assembly 208, and battery packs 220A-D (collectively 220).

The frame assembly 204 is the portion of the multirotor vehicle that is to be worn by the operator 104 and supports the rotor assembly 208. The frame body 304 can extend down toward the head of the operator 104, then curve backward to clear the head and down toward the operator's back. As shown, the frame assembly 204 can extend to an operator's waist, but this need not be the case in all instances. In addition, the assembly 204 can further position the rotor assembly 208 relative to the plane 120 to provide a maximum amount of thrust to lift or otherwise support the vehicle 100.

Attached to the frame assembly 204 is the rotor assembly 208 that is configured to provide thrust to lift at least a portion of the operator's mass to enhance an ability of the operator to perform physical activities. The rotor assembly 208 can be positioned above a head of the operator, as shown, to provide sufficient clearance between the limbs of the operator as the operator performs physical activities with the aid of the vehicle 100. In some examples, the rotor assembly 208 can be positioned about or coincident with the axis 116 of the combined center of gravity for the vehicle 100. The rotor assembly 208, in one example embodiment, includes rotors 210A-H (collectively 210), central hub 212, supports 214, and guard assembly 216. Generally speaking, the rotors 210 can be any kind of rotary propulsion device such as non-ducted propellers, electric ducted fans, or the like.

An example of one acceptable rotor assembly 208 includes the P80+G30*10.5+Flame 80A setup available from T-motor. In one example, each rotor 210 includes a P80-100 KV motor with a 30" carbon fiber propeller. The motor is connected to a Flame 80A rotor speed controller and is powered by a 44,000 mAh battery sufficient for 10-30 minutes of operation. Other batteries provide 22,000 mAh of power. Other motors are configured for 120 KV or 170 KV, for example. Such a rotor 210 can provide an estimated thrust of 17 Kg in accordance with some embodiments. In other embodiments, each rotor 210 can provide 5 Kg, 10 Kg, 15 Kg, 20 Kg, or more thrust. In some embodiments, the rotor assembly 208 can provide 10-100 Kg of thrust, including 20 Kg, 30 Kg, 40 Kg, 50 Kg, 60 Kg, 70 Kg, 80 Kg, or 90 Kg of thrust. Numerous variations and embodiments will be appreciated in light of the present disclosure.

Note that the ducts attached to the rotors 210 can provide additional protection to the operator 104 or otherwise eliminate the need for separate guard. An example of an electric ducted fan rotary thrust assembly is a ducted fan made by Schubeler, part no. DS-215-DIA HST, that is approximately 195 mm in diameter and generates approximately 55 lbs. of thrust. In other cases, the rotors 210 can include other shielding methods such as mesh, wire cages, or the like. As shown, the rotors 210 can be positioned in same plane or multiple planes, depending on a given application. The rotor assembly 208 can have as few as 3 rotors or as many as 20, depending on a given application. In general note that the number of rotors 210 can be based on factors such as safety considerations (e.g., level of redundancy) and the amount of assistance desired by the operator 104. The rotors 210 are configured to generate thrust to move the multirotor vehicle up and down, forward or backward, or side-to-side, as the case may be. The direction and amount of thrust generated by each rotor 210 can be dependent on the speed at which the rotors 210 rotate. In addition, in some examples, each rotor 210 can be controlled independently from other the rotors 210 (e.g., operating rotors at different speeds). In other instances, the rotors 210 can be operated collectively as a group or multiple sub-groups. Alternatively, changes in the position of one or more rotors 210 within the rotor assembly 208 relative to other one another can adjust the direction and/or amount thrust provided by the rotor assembly 208.

Furthermore, the rotors 210 can be configured to spin in opposite directions from one another to reduce or otherwise eliminate rotational forces applied to the frame by the rotors 210. The opposite rotation of the rotors 210 can prevent the rotor assembly 208 from rotating the frame assembly 204 along with the operator 104 attached thereto. In some examples, the rotors 210 can include first and second subgroups of rotors. The first subgroup being different from the second subgroup and within a first horizontal plane, and the second subgroup within a second horizontal plane different from the first horizontal plane. Numerous other rotor configurations will be apparent in light of the present disclosure.

Attached to the rotors 210 are supports 214 that are constructed and arranged to connect the rotors 210 to the central hub 212. The supports 214 can be configured to support one or more rotors 210, depending on a given application. In addition, the supports 214 position the rotors 210 relative to one another so that there is sufficient clearance between the rotors 210 as well as between the rotors 210 and the operator 104. The supports 214 can also determine an arrangement of the rotors 210. For instance, the supports 214 can position the rotors 210 in square pattern above the head of the operator 104. In some other examples, supports 214 can be constructed and arranged to position the rotors 210 in one of a circular, triangular, or star shaped pattern. Additionally, the supports 214 can position the rotors 210 symmetrically about a central hub 212 (as shown), but this need not be the case in all instances. In some embodiments, the supports 214 can position the rotors 210 relative to one another so that the center of the rotors 210 can be positioned along a circle having a diameter in the range from at least 24 in to as large as 72 in or more.

The rotor assembly 208 further includes a central hub 212 that connects supports 214 together to define a rigid or semi-rigid rotor assembly 208. In addition, the central hub 212 can also be further configured to attached to one end of the frame assembly 204. For instance, the hub 212 can be pivotally attached to the frame assembly 204 so that the rotor assembly 208 can be rotated to maintain the assembly 204 within the plane 120. In such cases, the central hub 212 can receive a shaft attached to an actuator, for example an electric rotary actuator. In particular, the central hub 212 can include features, such as splines or keyways, to engage complimentary features of the shaft of the actuator, such that rotation of the actuator causes the central hub 212 and rotor assembly 208 to rotate or otherwise tilt, as will be described further herein.

The rotor assembly 208 can also further include a guard assembly 216 configured to prevent contact between the operator 104 and rotors 210 of the rotor assembly 208. In one example, the guard assembly 216 includes a plurality of arms that extend outward from the central hub 212. As can be seen, the arms 218, in some examples, can be parallel to and just below the supports 214. Each of the arms 218 can be configured to receive several lengths of wire rope or welded metal wire shielding so that the rope (or shielding) forms a barrier when connected to at least two of the arms 218. Such guard configurations may be preferable in some instances because wire-type guards do not block or otherwise adversely impair the flow of air from the rotors 210 adjacent thereto. Numerous other guarding configurations will be apparent in light of the present disclosure.

The multirotor vehicle 100 also includes several battery packs 220 disposed on or within the frame assembly 204. The battery packs 220 can be rechargeable battery packs that include quick attach-detach mechanism clip for making up wiring harness connections. In some examples, the frame assembly 204 may include at least one solar panel to provide a source of power to charge the battery packs 220. The battery packs 220 can also be configured as wireless chargeable battery packs, and thus eliminate the need to remove the packs 220 from the vehicle 100 for the purpose of connecting the packs 220 to a power source.

Figure 3A:
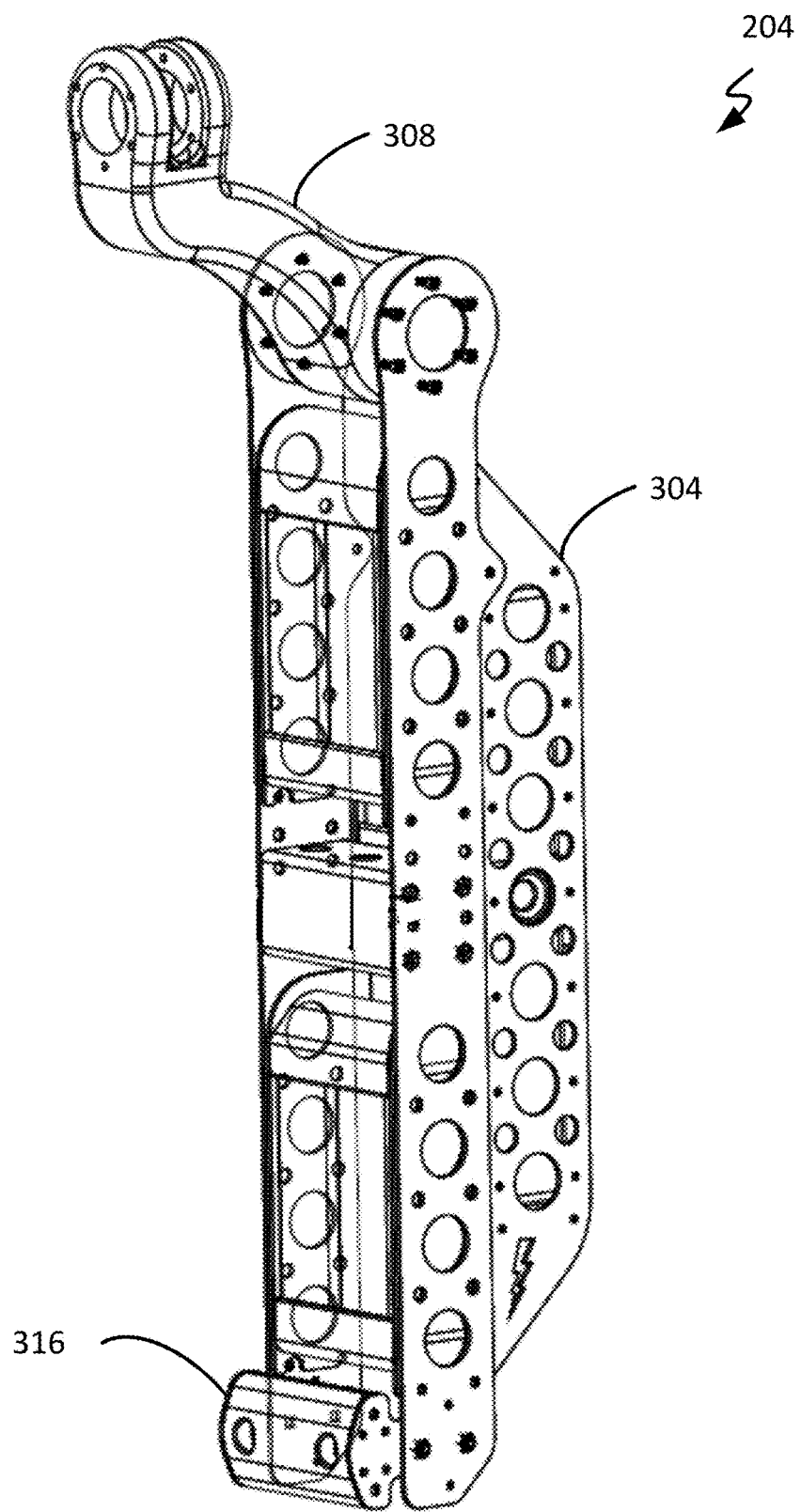
FIG. 3A is a perspective view of a frame shown in FIGS. 2A-2C, in accordance with an embodiment of the present disclosure.
Figure 3B:
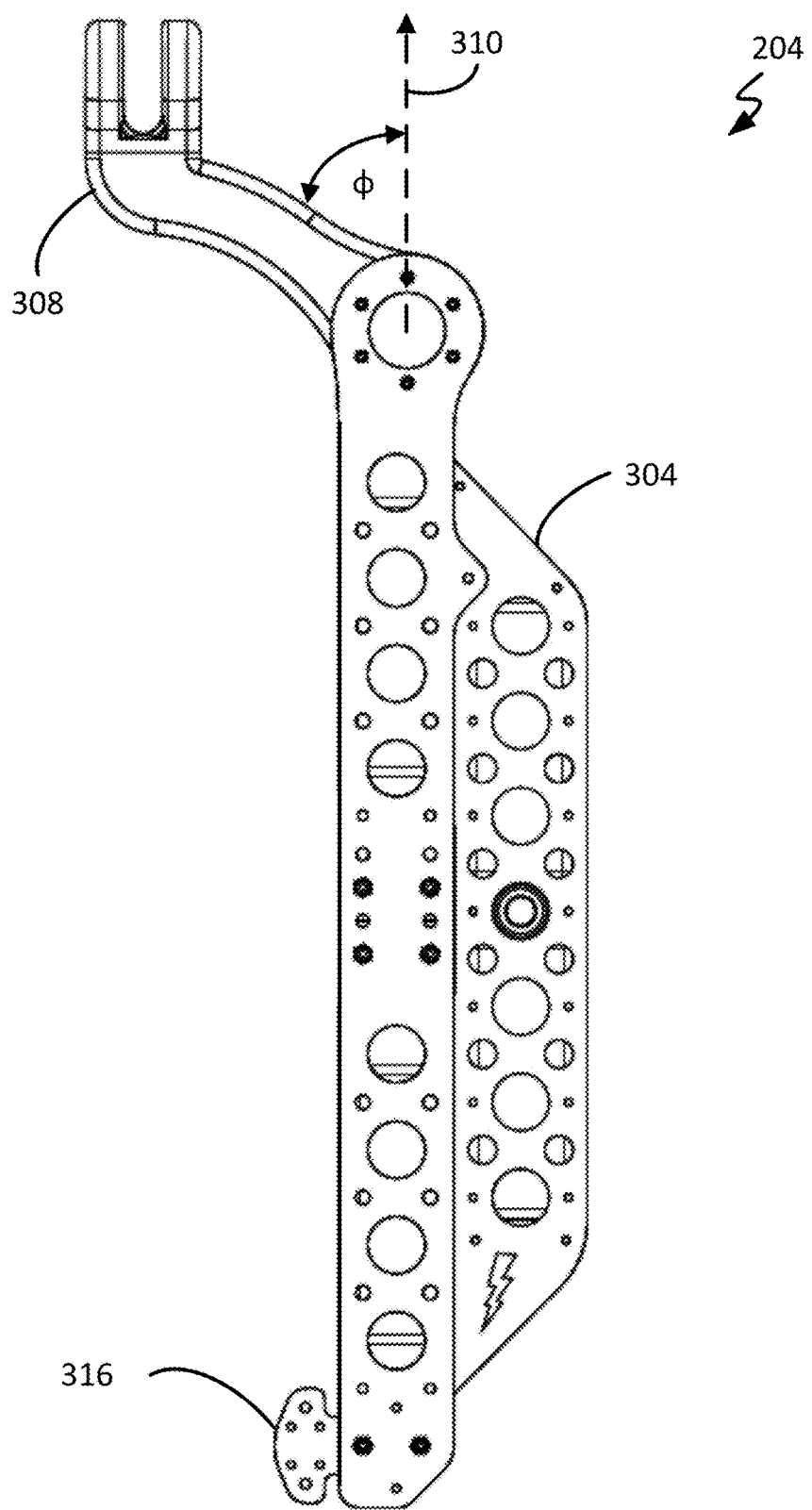
FIG. 3B is a side view of the frame shown in FIG. 3A, in accordance with an embodiment of the present disclosure.

FIG. 3A is a perspective view of a frame 204 shown in FIGS. 2A-2C, in accordance with an embodiment of the present disclosure. FIG. 3B is a side view of the frame 204 shown in FIG. 3A. As previously described above, the frame assembly 204 can be configured to position the rotor assembly 208 relative to the plane 120. To achieve such adjustments, the frame assembly 204, in accordance with one example, includes a rigid frame body 304 and a frame extension 308. As shown, the upper portion of the frame body 304 is configured to connect to one end of the frame extension 308. In this instance, the frame body 304 and frame extension 308 are pivotally connected to one another. For instance, frame extension 308 can be secured to the frame body 304 using bushings and a shaft of the rotary actuator. The shaft can be slotted or keyed so as to engage corresponding slots or a keyway on the frame extension 308, as will be described further herein. The rotary actuator (e.g., an electric or servo operated actuator) can be configured to rotate the shaft along with the frame extension 308 so as to position the frame extension 308 at an angle $\varphi$ from an axis 310 (e.g., a vertical axis) of the frame body 304. In turn, the frame extension 308 moves the rotor assembly 208 attached to its opposite end up and down. In particular, the rotary actuator can be configured to rotate the frame extension 308 from 135 degrees to 225 degrees relative to the vertical axis 310 of the rigid frame body 304. In other examples, the frame extension 308 can rotate between at least 100 degrees to 200 degrees or 120 degrees to 250 degrees, depending on the application. Using a control system of the multirotor vehicle 100, the rotor assembly 208 can maintain a level position no matter the position of the rigid frame body 304, as will be described further herein.

Figure 4A:
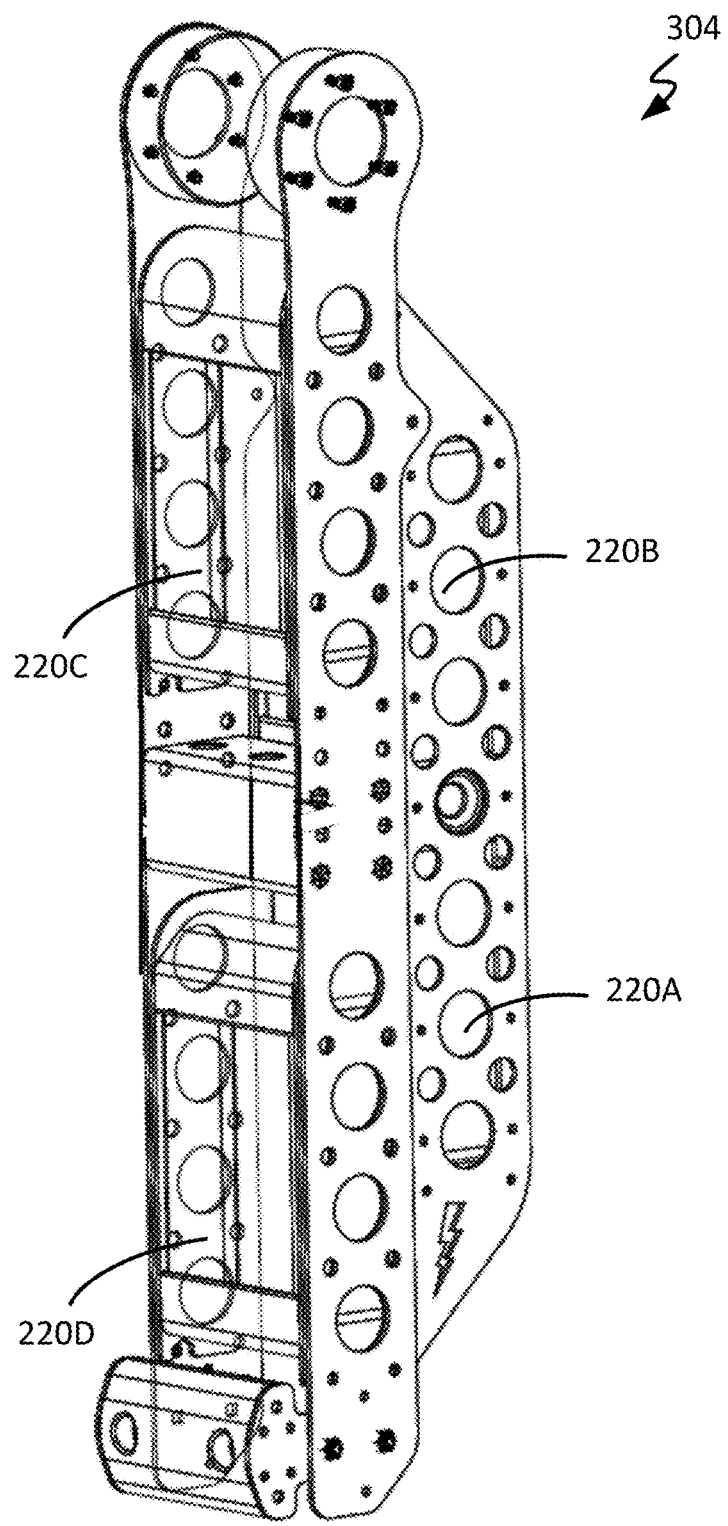
FIG. 4A is a perspective view of the rigid frame body shown in FIGS. 3A-3B, in accordance with an embodiment of the present disclosure.
Figure 4B:
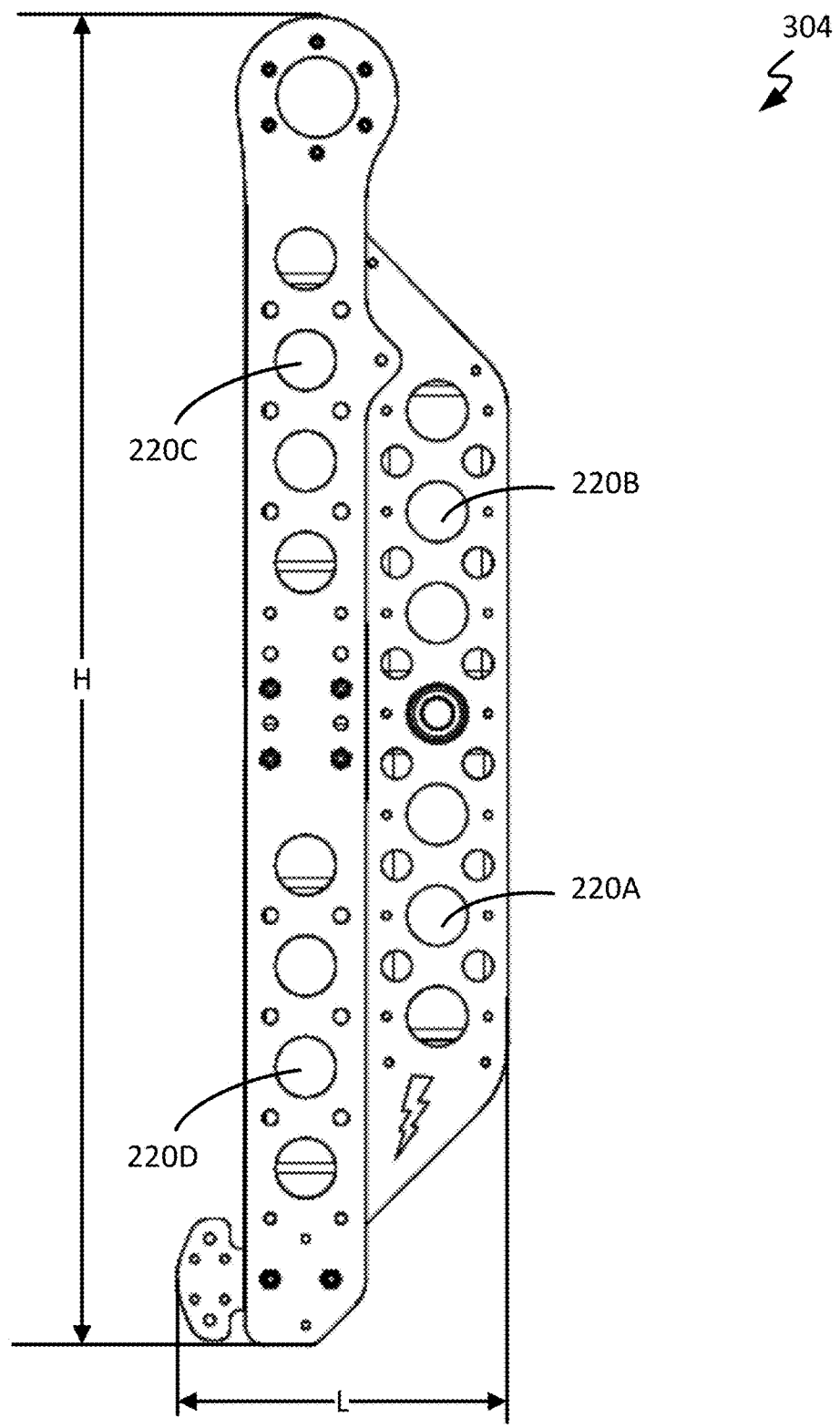
FIG. 4B is a side view of the rigid frame body shown in FIG. 4A, in accordance with an embodiment of the present disclosure.
Figure 4C:
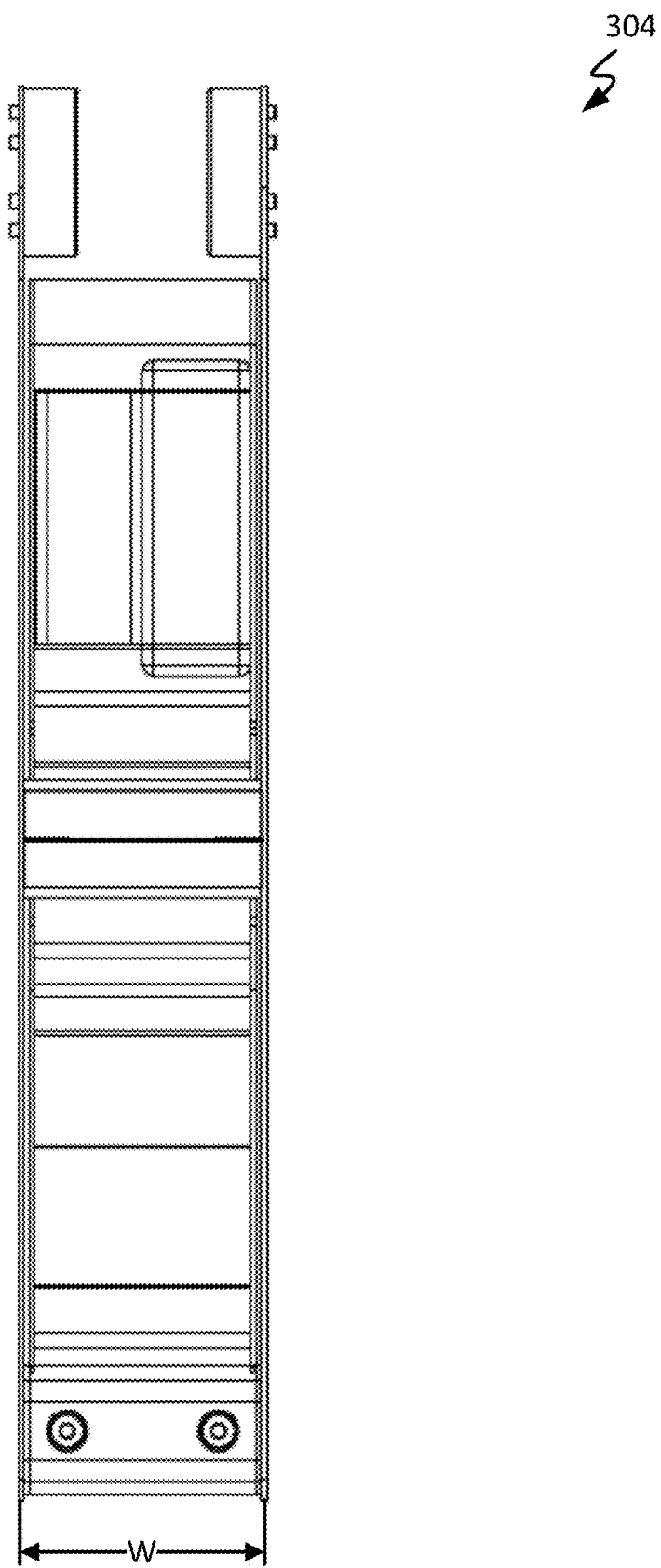
FIG. 4C is a front view of the rigid frame body shown in FIG. 4A, in accordance with an embodiment of the present disclosure.

FIG. 4A is a perspective view of the rigid frame body 304 shown in FIGS. 3A-3B, in accordance with an embodiment of the present disclosure. FIG. 4B is a side view of the rigid frame body 304 shown in FIG. 4A. FIG. 4C is a front view of the rigid frame body 304 shown in FIG. 4A. As previously described, the rigid frame body 304 can be worn on a back of the operator 104. In a general sense, the rigid frame body 304 can be any size or shape such that when assembled, the frame body 304 allows the operator 104 to perform one or more physical activities. For example, the frame body 304 can extend or otherwise be adjusted to extend to distance about the operator's waist and hips, so that the vehicle 100 does not interfere with the use of the operator's legs. In this one example, the frame body 304 includes a height H, length L, and a width W. In general, the frame body 304 can extend from a lower back and along a torso of the operator 104 to above the operator's head. The height H of the frame body 304 can be adjustable or fixed, depending on the application. In some cases, the height of the frame body 304 can be in the range of between 36 inches (in) and 50 in, at least 25 in to 60 in, and at least 30 in to 75 in. In contrast with the height H, the width W and length L can be relatively short. For example, the width W can be sized so that the frame body 304 can be centered along one's back as the multirotor vehicle 100 is worn by the operator 104. To this end, the frame body 304 can have a width W in the range of 4 in to 6 in, at least 3 in to 7 in, and at least 6 in to 12 in. In addition, the length L can also be relatively short, for example just several inches in some cases. In general sense, the length L can be sufficient to allow electronic components, such as the battery packs 220, to be installed within the frame body 304 so that the battery packs 220 can be protected during operation of the multirotor vehicle 100. For instance, the length L can be in the range of at least 10 in to 14 in, at least 12 in to 24 in, and at least 16 in to 30 in, depending on a given configuration. To this end, the frame body 304 can be a compact and robust design that allows the operator 104 to comfortably and securely wear the multirotor vehicle 100, and yet not allow the vehicle 100 to move separately from one's torso. For instance, the frame body 304 can be configured to move with one's torso, especially during twisting or bending, so that operator 104 remains in fixed contact with the body 304 during operation of the multirotor vehicle 100. The frame body 304 can be a single unitary piece or made from multiple pieces that are attached to another, for example using mechanical connectors or welded joints. In addition, the rigid frame body 304 can be made from lightweight and high-strength materials, composite materials such as polymeric or fiber polymer hybrid materials. Particularly, materials such as carbon fiber, aluminum, or titanium can be suitable for use in manufacture of the frame body 304.

In addition, the frame body 304 can house electronic components and wiring to operate the multirotor vehicle 100. For instance, the frame body 304 can be manufactured from shafts, piping or tubing materials in which electrical components can be installed therein. Such an assembly of components not only protects the electronic components from physical or mechanical damage but also protects those components from environment elements (e.g., water, dust, and dirt). In addition, the members of the frame body 304 can be permanently attached to one another or include quick disconnect devices to allow for ease of assembly and disassembly of the frame body 304, such as when transporting the multirotor vehicle 100. The quick disconnect arrangement of the frame body 304 also allows quick and easy access to wiring or electronic components installed within the members of the body 304.

The frame body 304 can also be configured to house the battery packs 220 used to supply power to operate the multirotor vehicle 100. The locations of battery packs 220, in some examples, can be selected based on the overall weight distribution of the vehicle 100. For instance, the battery packs 220, in some instances, can be installed at a distance from axis 310. In other instances, the battery packs 220 can be installed within the frame body 304 and along axis 310 to change a center of gravity of the multirotor vehicle 100. In yet other examples, the battery packs 220 can be installed at many different locations within the frame body 304 to evenly distribute battery pack weight throughout the vehicle 100. In addition, the frame body 304 can also further include a plurality of connection points for use with the harness 108 so as to locate portions of the harness 108 about the torso of the operator 104, for example at a back, shoulders, and waist of the operator 104. To enhance the comfort and fit of the frame body 304 with one's back, the body 304 can further include one or more padded surfaces. For instance, as can be seen, the rigid frame body may include a support pad 316. The pad 316 can be manufactured from padding or similarly soft material to provide comfort and support to the body of the operator 104.

In addition, the frame body 304 can be configured to facilitate attachment of the operator 104 to the multirotor vehicle 100. For instance, the frame body 304, in some examples, can wrap around a portion of the body of the operator 104, such as at a waist, chest, or shoulders, to further secured the operator 104 to the body 304. In some instances, the frame body 304 can be configured to receive one or more ends of the harness 108. The frame body 304 can include a receiver (e.g., a hook member) configured to receive straps and/or connectors of the harness 108. The frame body 304, in some examples, can include legs that extend and retract. When extended, the legs can support the multirotor vehicle 100 so that the operator 104 can attach to or detach from the vehicle 100 without the need to support the weight of the vehicle 100 or otherwise having to operate the vehicle 100. Once the vehicle 100 is attached to the operator 104, the legs can be retracted out of the way so that the operator 104 can freely use the multirotor vehicle 100. The legs can also be used to assist with landing the multirotor vehicle 100 on a ground surface.

Figure 5A:
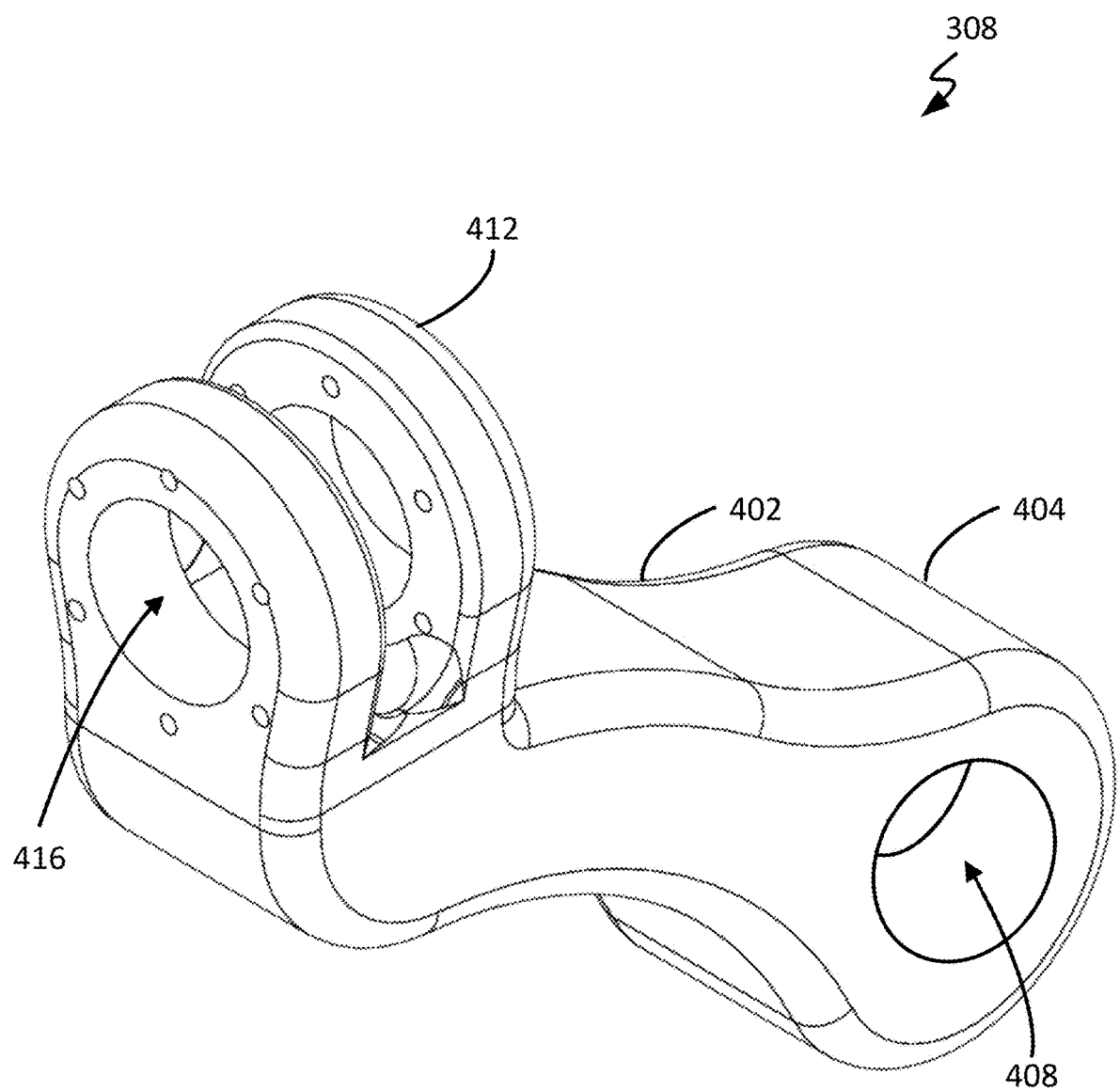
FIG. 5A is a perspective view of a frame extension of the frame shown in FIGS. 3A-3B, in accordance with an embodiment of the present disclosure.
Figure 5B:
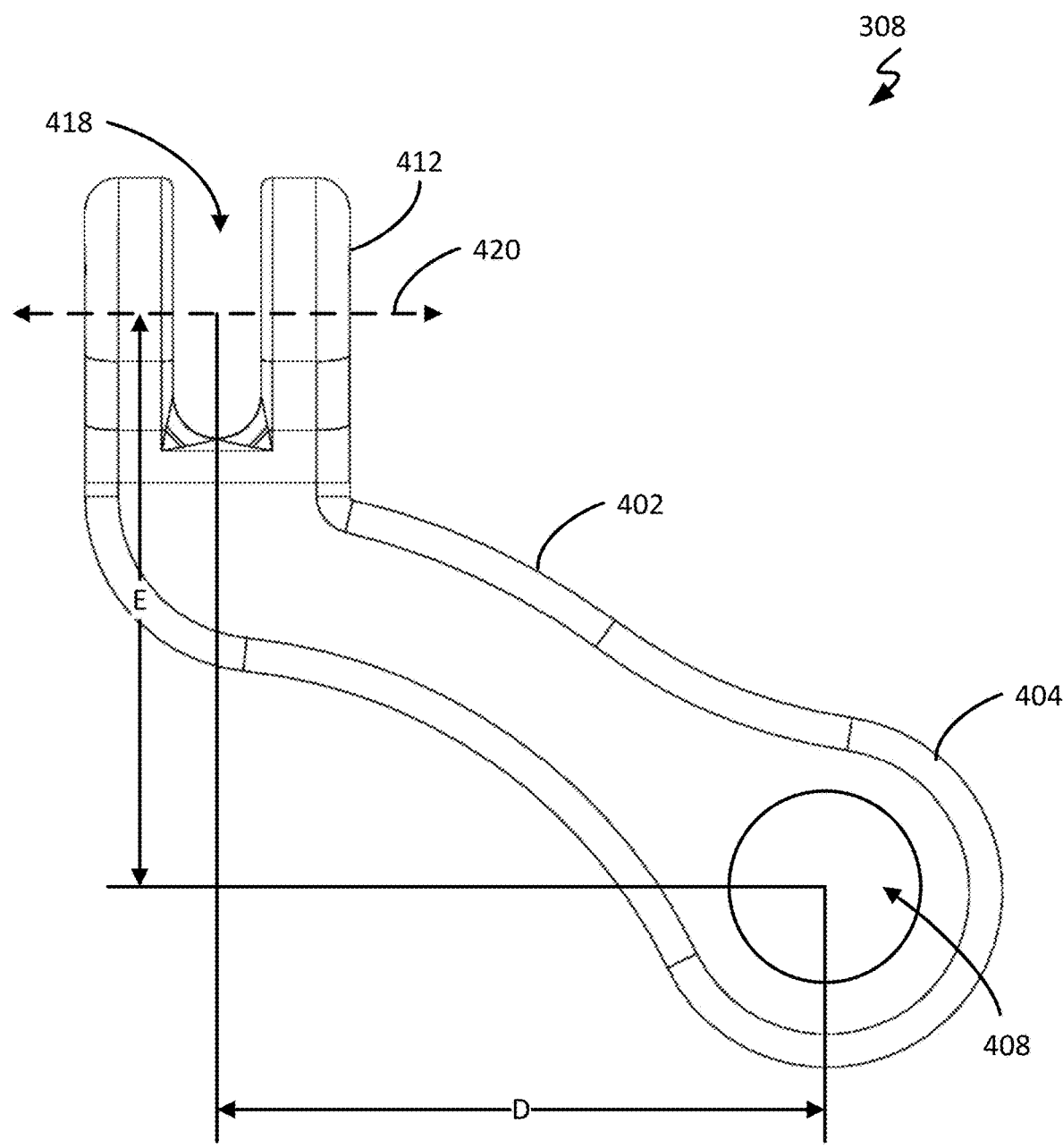
FIG. 5B is a side view of the frame extension shown in FIG. 5A, in accordance with an embodiment of the present disclosure.

FIG. 5A is a perspective view of a frame extension 308 of the frame shown in FIGS. 3A-3B, in accordance with an embodiment of the present disclosure. FIG. 5B is a side view of the frame extension shown in FIG. 5A. As described above, the frame extension 308 connects the rotor assembly 208 to the frame body 304. In addition, the frame extension 308 is configured to pivot relative to the frame body 304 to maintain the rotor assembly 208 in a level or otherwise non-angled position as the multirotor vehicle 100 moves with a torso of the operator 104, as described herein in relation to FIGS. 8A-C. The frame extension 308 can be further configured to allow the rotor assembly 208 to pivot relative to the frame extension 308, in a direction that normal to direction in which the frame extension 308 rotates relative to the frame body 304, as will be described further herein. In an example embodiment, the frame extension 308 includes a body 402 having a first end 404 and a second 412 for connecting with the frame body 304 and rotor assembly 208, respectively.

The body 402 is configured to position the rotor assembly 208 above the head of the operator 104. As can be seen, the body 402 can be a curved body with one end positioned above the other. In this particular case, the first end 404 is positioned below the second 412 so that when the frame extension 308 is attached to the frame body 304 the extension 308 provides sufficient clearance between the body 402 and the head of the operator 104. The body 402 can be a single unitary piece or made from multiple pieces such as a weldment. In addition, the body 402 can be made from lightweight and high-strength materials, composite materials such as polymeric or fiber polymer hybrid materials. Particularly, materials such as carbon fiber, aluminum, or titanium can be suitable for use in manufacture of the body 402.

The body 402 may include a first end 404 that is configured to connect or otherwise attach to one end of the frame body 304. As shown, the first end 404 can be rounded with a bore 408 passing therethrough. The bore 408 can be configured to receive a shaft of the rotary actuator to connect the frame extension 308 to the frame body 304. The bore 408 can include splines or a keyway to receive complementary features of the shaft to allow the frame extension 308 to rotate with the shaft. In addition, the bore 408 can be positioned relative to a slot or channel 418 of the second end 412, as shown by dimension D. Dimension D can be in the range of at least 6 inches (in) to greater than or equal to 12 in, at least 3 in to greater than or equal to 15 in, or at least 8 in to greater than or equal to 16 in. Note that the dimension D can define the range of vertical adjustment that the frame extension 308 can provide.

In addition, the body 402 can further include a second end 412 configured to receive the central hub 212 of the rotor assembly 208. For example, the second end 412 can include slot or channel 418 to attach to the central hub 212. An actuator, such as an electronic rotary actuator, can be installed on the second end 412 so that a shaft of the actuator passes through the end 412 to engage or otherwise attach to the central hub 212. In addition, the second end 412 can be offset from the first end 404 so that the frame extension 308 provides clearance between the body 402 and the head of the operator 104 when the extension 308 is attached to the frame body 304. For instance, the second end 412, in some examples, can be positioned at a height above the first end 404, as shown by dimension E in FIG. 5B. In general note that dimension E can be any size so long as there is sufficient clearance between the frame extension 308 and the head of the operator 104 to allow for adjustment in the position of the rotor assembly 208 to compensate for bending or twisting of the operator's torso. Dimension E, in some examples, can be in the range of at least 3 in to equal to or greater than 10 in, at least 6 in to equal to or greater than 20 in, or at least 10 in to equal to or greater than 18 in. Numerous other frame extension configurations will be apparent in light of the present disclosure.

Figure 6:
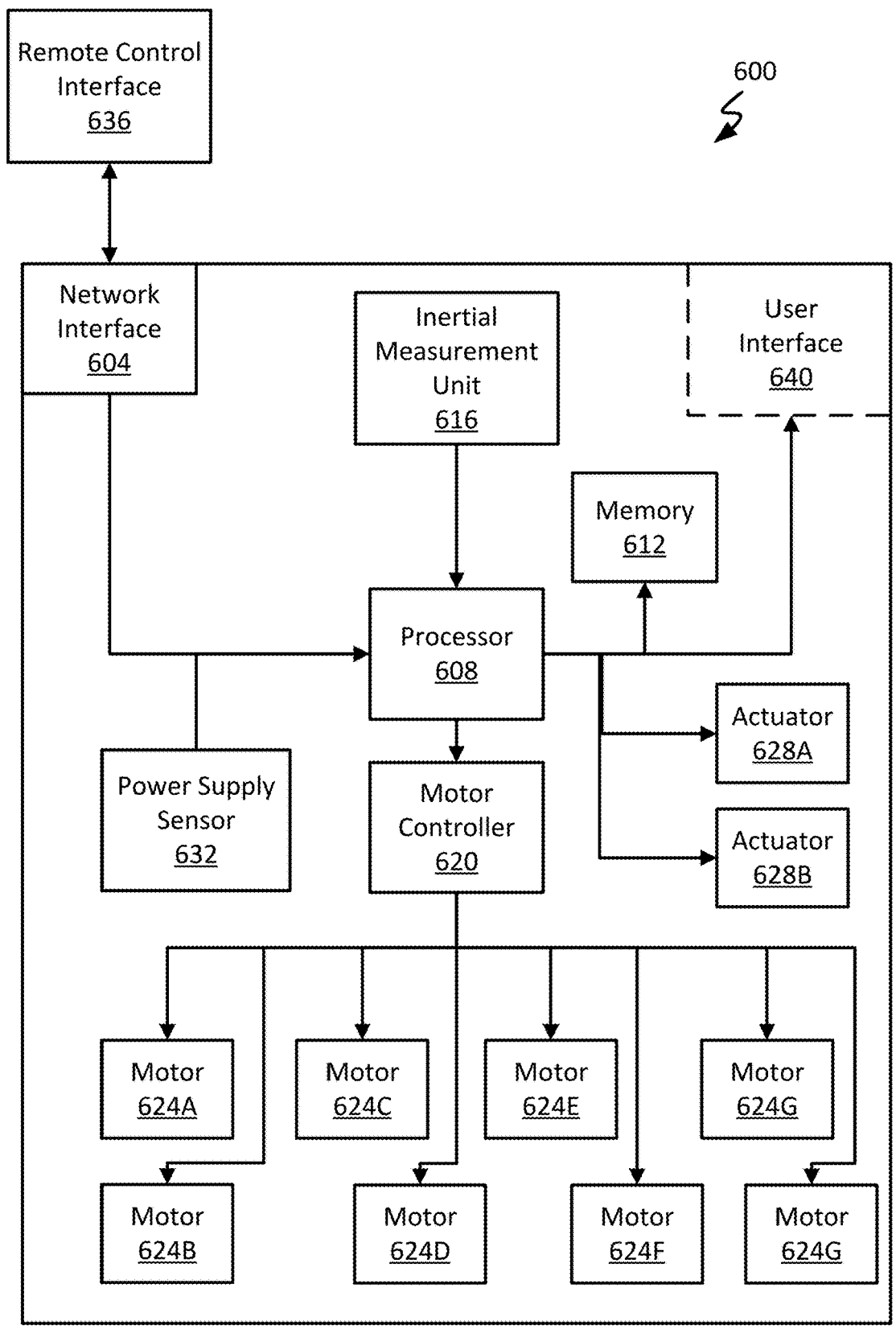
FIG. 6 is a block diagram of a control system of the multirotor vehicle, in accordance with an embodiment of the present disclosure.
Figure 7:
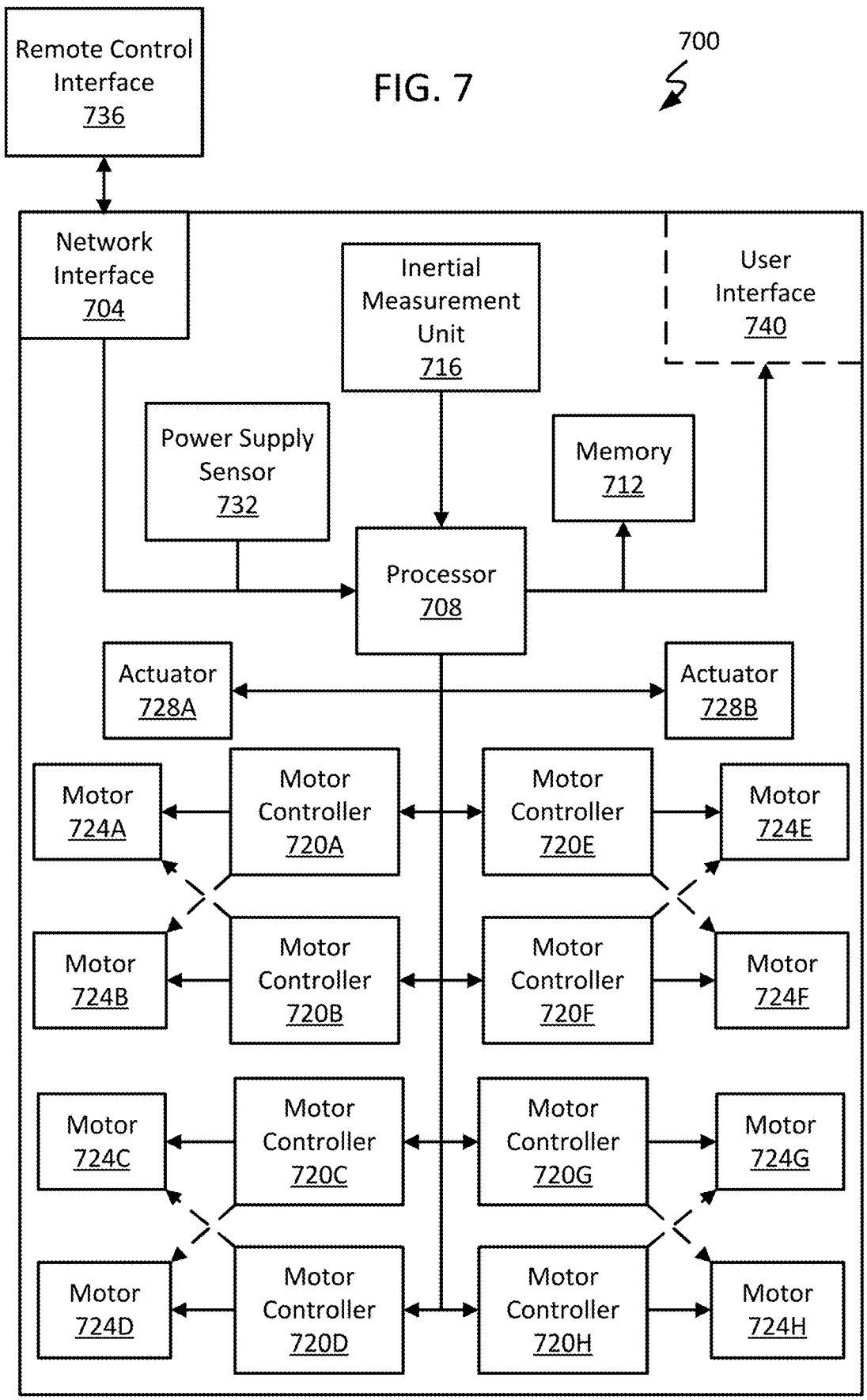
FIG. 7 is a block diagram of a control system of the multirotor vehicle, in accordance with another embodiment of the present disclosure.

FIG. 6 is a block diagram of a control system 600 configured to operate the multirotor vehicle 100, in accordance with an embodiment of the present disclosure. FIG. 7 is a block diagram of a control system 700 configured to operate the multirotor vehicle 100, in accordance with another embodiment of the present disclosure. The multirotor vehicle 100 can include a control system 600 for adjusting the position of the rotor assembly 208 to maintain a level orientation above the head of the operator 104 while the vehicle 100 is worn by the operator 104. Note that control system 600 can be configured so that the feet of the operator 104 are not used to control or engage the multirotor vehicle 100. Instead, the operator's feet are free to traverse terrain. The control system 600, in accordance with an example embodiment, can include a network interface 604, a processor 608, a memory 612, an inertial measurement unit 616, a motor controller 620, motors 624A-D (collectively 624), actuators 628A-B (collectively 628), a power supply sensor 632, and a remote control interface 636. In addition, the control system 600 can optionally include (as indicated by the dashed lines) a user interface 640. The control system 600 can be implemented using software, hardware, and firmware (or a combination thereof).

The control system 600 can include a network interface(s) 604 that exchanges (e.g., sends or receives) information, such as operational/flight commands and guidance information, with a control device via the remote control interface 636, described below. Generally speaking, the network interface(s) 604 executes instructions and/or commands from the processor 608 to establish a network connection between the control system 600 and a control device, for example a mobile computing device, depending on a given application. Information exchanged via the network interface(s) 604 may include any information used to establish and support a network connection between the system 600 and the control device. The network interface(s) 604 can be configured for wired (e.g., Universal Serial Bus or USB, Ethernet, FireWire, etc.) and/or wireless (e.g., Wi-Fi, BLUETOOTH®, ZIGBEE®, etc.) communication, as desired. In one example, the network interface(s) 604 includes a transceiver or other network interface circuit configured to communicate locally and/or remotely utilizing any of a wide range of wired and/or wireless communications protocols, including, for example: a Wi-Fi protocol. Other suitable configurations for network interface(s) 604 will depend on a given application and will be apparent in light of this disclosure.

Communicatively coupled to the network interface(s) 604 is at least one processor 608 to implement at least some of the aspects, functions and processes disclosed herein. Generally speaking, the processor 608 performs a series of instructions that result in manipulated data. The processor 608 may be any type of processor, multiprocessor or controller. Some exemplary processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 608 is connected to other system components, including one or more memory devices, by for example using a bus.

The control system 600 further includes the memory 612 configured to store programs and data during operation of the system 600. Generally speaking, the memory 612 can be of any suitable type (e.g., RAM and/or ROM, or other suitable memory) and size, and in some cases, may be implemented with volatile memory, non-volatile memory, or a combination thereof. In some examples, memory 612 can be a relatively high performance, volatile, random access memory such as a dynamic random-access memory (DRAM) or static memory (SRAM). The memory 612 can receive information from other system components, inertial measurement unit 616, to operate the multirotor vehicle 100.

As can be seen, the control system 600 further includes at least one inertial measurement unit 616. Generally speaking the inertial measurement unit (IMU) 616 can be an electronic device that measures the force and/or magnetic field acting on or otherwise surrounding a body, such as the multirotor vehicle 100. The IMU 616 can measure or otherwise determine the roll, pitch, and yaw of the multirotor vehicle 100. In addition, the IMU 616 can also measure or determine an angular rate of change in the position of the vehicle 100. The IMU 616 can include several sensors, such as accelerometers and gyroscopes configured to measure or otherwise collect data regarding linear acceleration and an angular displacement of the vehicle 100, respectively. The measured data can be used to operate the multirotor vehicle 100, for example to adjust a velocity of the vehicle 100 or to maintain the rotor assembly 208 at a level position relative to the frame assembly 204. The measurements or data taken by the IMU 616 can be stored in one or more data structures of the memory 612. In addition, the measurements can also be transmitted to the remote control interface 636 via the network interface(s) 604 so that the operator 104 can fly or otherwise maneuver the vehicle 100.

The control system 600 further includes a motor controller 620 configured to operate the motors 624 of the rotor assembly 208 to assist with operator movements. Generally speaking the motor controller 620 can be a device (or a group devices) that controls the operation of at least one motor 624, for example to start or stop the motor 624 or adjust a speed at which to operate the motor 624. In addition, the motor controller 620 can be configured to select a direction of motor rotation, regulate or limit torque of the motor 624, and prevent an overload condition of the motor 624 which could damage the motor 624 or otherwise reduce motor performance. In addition, in some examples, the control system 600 can include multiple motor controllers. For instance, as shown in FIG. 7, the control system 700 can be constructed and arranged to include multiple motor controllers 724A-D (collectively 724) so that each motor controller 720 controls one motor 728 or a subset of motors 728 that is not all of the motors 728 of the multirotor vehicle 100. Such a configuration can improve safety of the vehicle 100 such that if one of the motor controllers 720 stops functioning then the remaining the controllers 720 can continue to operate a portion of the rotors of the rotor assembly 208. In some such examples, the control system 700 is configured to determine when a motor controller 724 is no longer functioning. In turn, the control system 700 can be configured to enable one of the remaining controllers 724 operate the motor 728 associated with the failed controller 724 (as shown with the dotted lines). Numerous other motor controller configurations will be apparent in light of the present disclosure.

Referring back to FIG. 6, the motor controller 620 can be communicatively coupled to one or more motors 624. In general, the motors 624 can convert electrical energy into mechanical energy. For instance, motors 624 can be electric motors configured to rotate rotors of the rotor assembly 208 to generate thrust to lift the multirotor vehicle 100 to enhance movements of the operator 104. Each of the motors 624, in some examples, can be attached to a plurality of propellers (e.g., two, four, or more) so that rotation of the motors 624 rotates the propellers. Motors 624 can be electronically connected to the motor controller 620 using quick disconnect integrated wiring connections. The motors 624 can be individually or collectively controlled (or both) to provide a desired magnitude and/or direction of thrust, depending on a given configuration of the vehicle 100. The motors 624, in some cases, can be brushed or brushless DC motors, depending on a given application.

In addition, the control system 600 further includes actuators 628 configured to move the rotor assembly 208 to maintain a position of the assembly 208 relative the horizontal plane 120. In general, the actuators 628 can be rotary actuators, such as electric servomotors or stepper motors, which provide smooth continuous movement of the frame extension 308 and the rotor assembly 208 at a control speed and/or controlled range of angular movement. The actuators 628, in some examples, can be configured to provide rotational movement in at least ½ degree, 1 degree, 2 degree, 5 degree, or 10 degree increments, to name just few increments of rotational change. To this end, the actuators 628, in some examples, can be provide continuous rotational adjustment of the rotor assembly 208 and/or frame extension 308. In one example, the multirotor vehicle 100 includes two actuators 628A and 628B. The actuator 628A can rotate the frame extension 308 relative to the axis 310 of the frame body 304 so as to move the extension 308 through the angle φ, as previously described herein. Similarly, actuator 628B can be configured to rotate the rotor assembly 208 to position the rotor assembly 208 within the plane 120. In particular, the actuator 628B can adjust the rotor assembly 208 between 35 degrees and 160 degrees relative to an axis normal to the horizontal plane 120. In some other instances, the adjustment of the rotary assembly 208 can be done between 50 degrees and 135 degrees or between 30 degrees and 165 degrees relative to the axis normal to the horizontal plane 120.

The control system 600 can also include a power supply sensor 632 configured to monitor power available from one or more of the battery packs 220 and transmit power supply data to the operator 104 via one of the remote control interface 636 or user interface 640. In general, the power supply sensor 632 can be any sensor, for example a voltmeter or ammeter, that measures an output from the battery packs 220. In some examples, a low battery indication can be communicated to the operator 104 using one or more light sources, such as light emitting diodes, integrated within the frame assembly 204 or rotor assembly 208 (or both). In other cases, a low battery alarm can be presented via a display of the remote control interface 636 or user interface 640.

Furthermore, the control system 600 further includes a remote control interface 636 to present and receive information to operate the multirotor vehicle 100. For example, the remote control interface 636 can be mobile computing device, such as a smart phone, smart watch, or smart glasses, which includes an application to operate the multirotor vehicle 100. In such instances, the application is configured to receive and display information via the network interface 604. In turn, the operator 104 can enter information and/or commands via the application to control or otherwise operate the multirotor vehicle 100. Commands, such as adjustments to rotor speeds, can be provided, for example, by touch input or voice commands, to allow for on the fly adjustments as the operator 104 using the vehicle 100. In some examples, the multirotor vehicle 100 may optionally include a user interface 640 that can be integrated within the frame assembly 204, for example with an onboard display touch screen or touch sensitive display. The onboard display can be communicatively coupled to the processor 608 so as to send and receive information to other components of the control system 600, such as the motor controller 620 or actuators 628. In addition, the onboard display can be configured to present a control panel to make adjustments to the operation of the multirotor vehicle 100.

The control system 600 may also include a number of sensors and/or devices that can assist with the operation of the multirotor vehicle 100. The control system 600 may include additional sensors configured to stabilize the multirotor vehicle 100 and to provide auxiliary functions. For instance, the system 600 can include barometric pressure sensors and a compass to measure and record data regarding the altitude and direction of the multirotor vehicle 100, respectively. This data can be used to assist the operator 104 with navigating through an environment. In addition, the multirotor vehicle 100 can also include components for sending and receiving global positioning system (GPS) data, such as GPS transceivers, to further assist with navigation through the environment. The control system 600, in some examples, can also include sensors configured for sonar navigation for instances, in which the operator 104 experiences low visibility, such as when traveling in dense fog or at night. In some such instances, sonar sensor data can be used to determine when the operator 104 is in falling. Upon receipt of such input, the processor 608 can initiate preprogrammed routine or sub-routine to stop the falling descent of the operator 104, for example by increasing thrust to lift the operator 104 so that the operator is no longer falling. In some examples, data from the accelerometer can also be used to determine whether the operator 104 is falling. For example, acceleration measurements above a threshold limit, such as 20 feet per second, can cause the control system 600 to activate the motors 624 to provide thrust equal to or greater than 75%, 85%, 90%, or 95% of a maximum thrust of the multirotor vehicle 100. The control system 600 can also include cameras and other sensors (e.g., gyroscopes) to allow the multirotor vehicle 100 to hover in place so that the operator 104 can attach themselves to the harness or frame assembly 204 without the need to support or otherwise hold the weight of the vehicle 100.

Figure 8A:
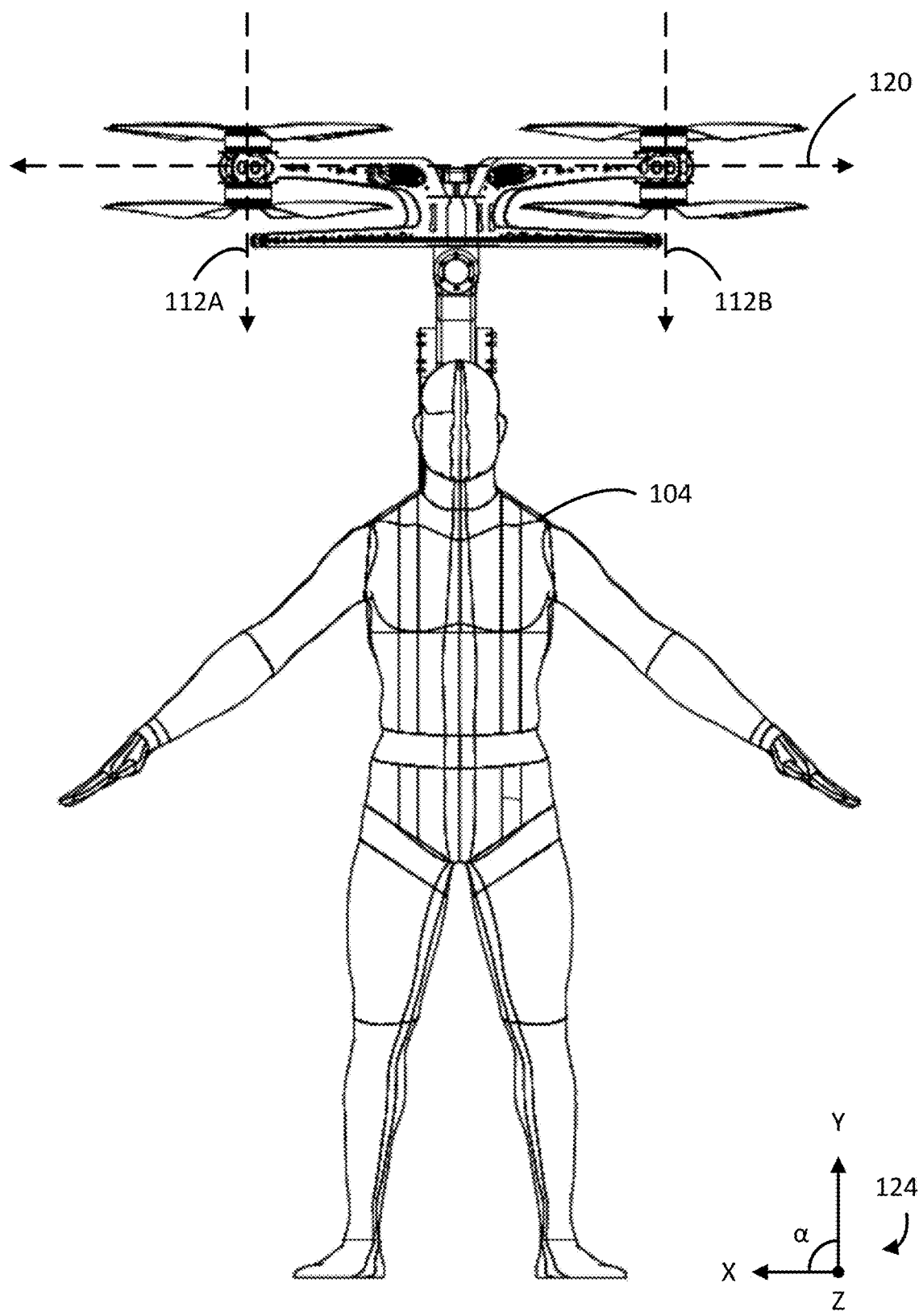
FIGS. 8A-8D is illustrate operation of the multirotor vehicle, in accordance with an embodiment of the present disclosure.
Figure 8B:
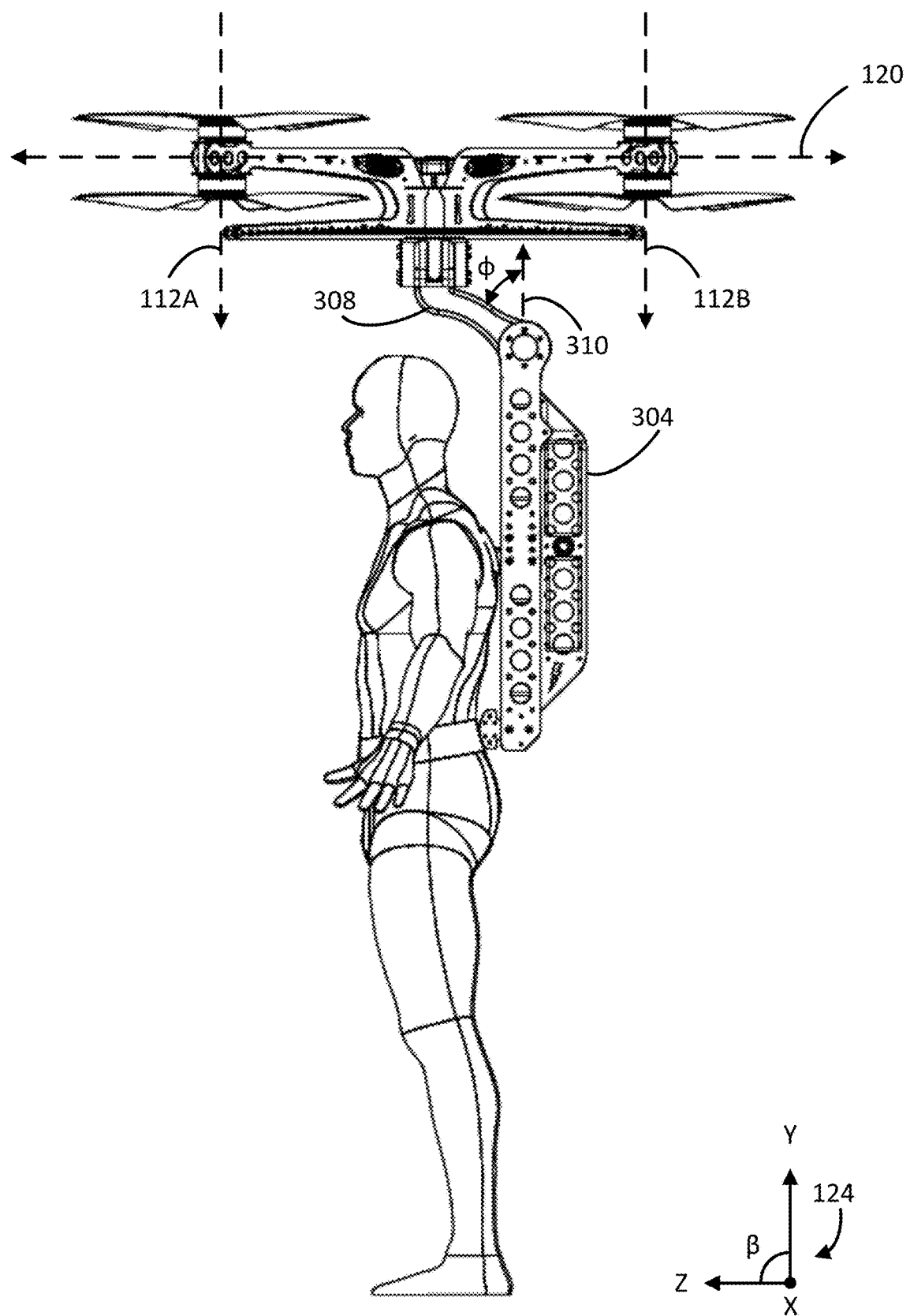

FIGS. 8A-8D is illustrate operation of the multirotor vehicle 100, in accordance with an embodiment of the present disclosure. As previously described above, the multirotor vehicle 100 is configured to assist the operator 104 in performing physical tasks, such as walking, running, climbing, and ascending and descending terrain. To this end, the vehicle 100 is configured to provide thrust to lift some (or all) of the mass of the operator 104 so as to help the operator 104 overcome gravitational forces. As can be seen in FIGS. 8A and 8B, the operator 104 can begin using the multirotor vehicle 100 when in a standing position, in which the operator's back is perpendicular or otherwise normal to a ground surface on which the operator 104 is traversing. In such a configuration, the multirotor vehicle 100 is positioned such that the thrust axes 112 are parallel to axis 116 of the combined center of gravity of the operator 104 and vehicle 100. In addition, the rotor assembly 208 is in a plane 120 so that a maximum amount of thrust generated by the rotors of the assembly 208 is used to counteract the forces of gravity.

Figure 8C:
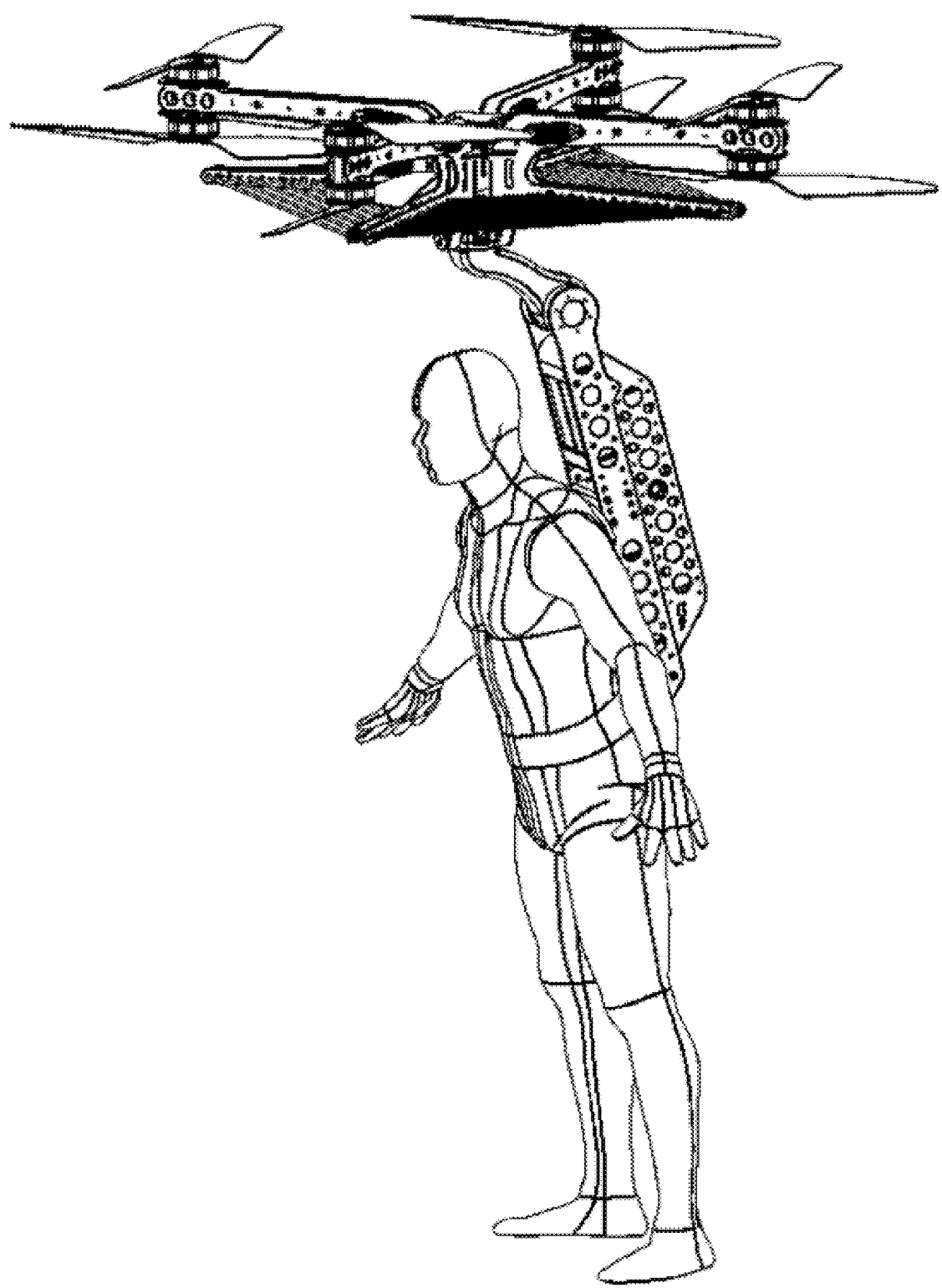
Figure 8D:
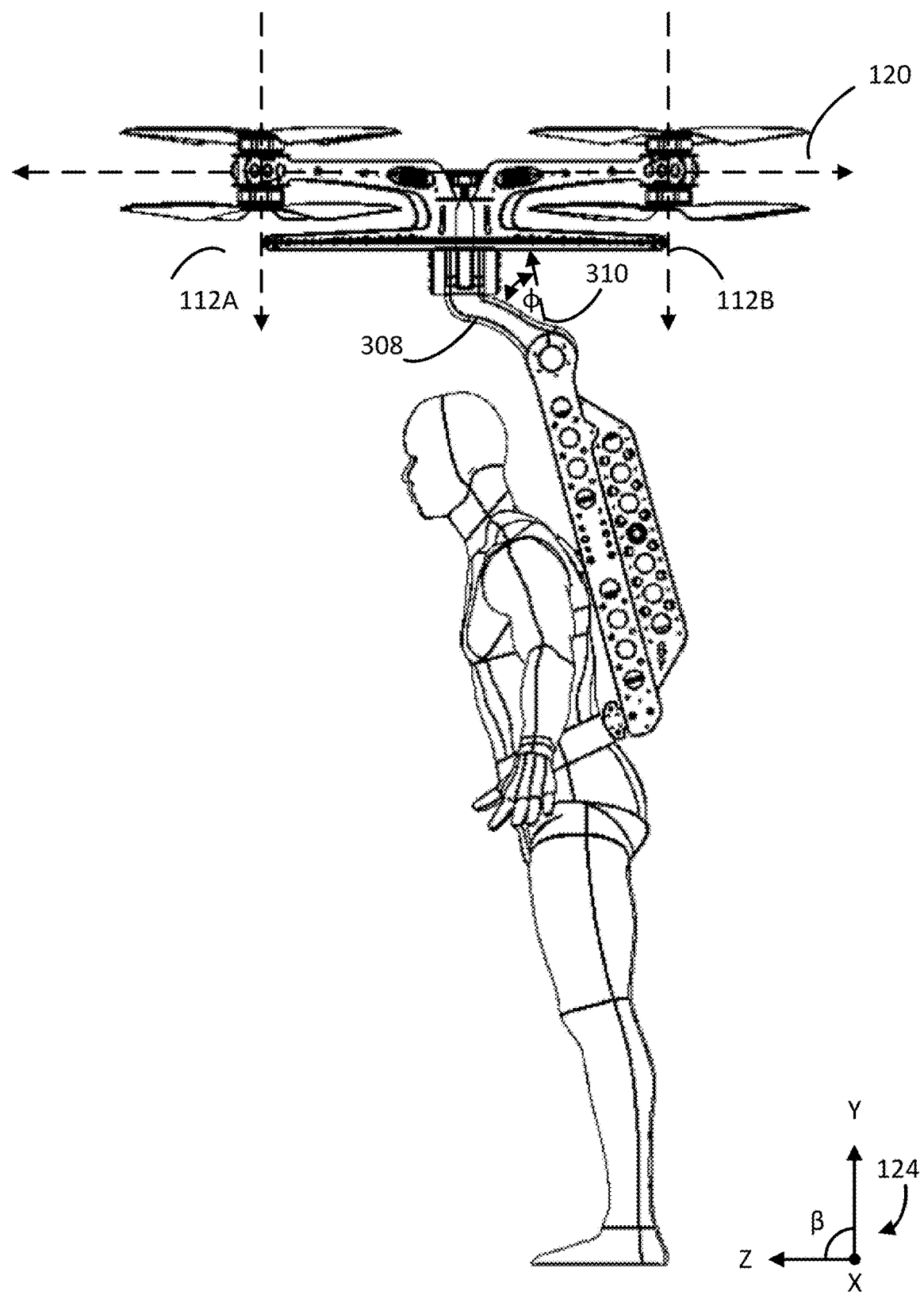

However, during the performance of many physical tasks, the body of the operator 104 can be bent or otherwise contorted such that the torso of the operator 104 is no longer vertical. For instance, when climbing or ascending a hill or mountain, a person's natural instinct is to bend at the back so that it is easier to climb the terrain. As a result, the multirotor vehicle 100 attached to the operator's torso also experiences a change in orientation that can significantly reduce the portion of thrust that provides lift. To prevent such a reduction in useful thrust, the multirotor vehicle 100 is configured to detect or otherwise measure a change in orientation of the vehicle 100, and in turn reposition the rotor assembly 208 so as to provide a maximum amount of thrust in a direction to provide lift. In particular, the control system of the vehicle 100 can determine a change in position of the vehicle 100, as shown in FIGS. 8C and 8D, using components, such as an IMU that includes sensors like gyroscopes and accelerometers. Such sensors can measure an angle of the rotor assembly 208 relative to the plane 120 (e.g., angle $\beta$ between the z and y axes of coordinate system 124). In response, the control system can use the sensor data from the inertial measurement unit to adjust the position of the rotor assembly 208 so that the assembly remains in the plane 120. The control system can operate an actuator, such as actuators 632A or 732A, to raise or lower the frame extension 308 relative to the frame body 304 so that the rotor assembly 208 remains substantially in the plane 120 defined by x and z axes of coordinate system 124. For instance, as can be seen in FIG. 8D, movement of the frame extension 308 causes a reduction in the angle $\varphi$ so that the rotor assembly 208 is raised further above the head of the operator 104 and within plane 120. In some instance, for example when the operator 104 is tying a shoe, the frame extension 308 can be positioned substantially parallel with the frame body 304 so that the angle $\varphi$ is nearly zero degrees. In some other instances, the angle $\varphi$ can be a negative angle so that the frame extension is rotated beyond axis 310 of the frame body 204.

In addition, the operator's torso may also turn or otherwise twist, for example when reaching for an object, so that the rotor assembly 208 is no longer in the plane 120. In such instances, there can be a reduction in thrust providing lift to aid the operator 104. To reduce or otherwise prevent such a reduction in useful thrust, the multirotor vehicle 100 can further be configured to adjust the rotor assembly in a side-to-side fashion, such as along the x-axis of coordinate system 124. For example, the control system can be configured to measure an angle of the rotor assembly 208 relative to the plane 120 (e.g., angle $\alpha$ between the x and y axes of coordinate system 124) using sensors, such as a gyroscope. In turn, the processor can transmit commands to operate an actuator, such as actuators 632B and 732B, to rotate the rotor assembly 208 in a side-to-side direction to position the assembly 208 substantially within the plane 120. Once substantially within the plane 120, the thrust produced by the rotor assembly 208 provides maximum lift to the operator 104. The maximum lift can be 70, 80, 85, 90, 95, and 98 percent of the thrust output from the rotor assembly 208. To this end, the multirotor vehicle 100 of the present disclosure is configured to continuously position the rotor assembly 208 so that it provides maximum lift to the operator 104, regardless of the operator's body position.

Further Considerations

The multirotor vehicle in some further embodiments can be operated with or without an operator. For instance, the vehicle can be configured for stable flight without the operator attached thereto. For example, the vehicle can be autonomously operated to retrieve the operator. To this end, the control system may include one or more operational modes. For example, the control system may include a first operational mode configured to operate the multirotor vehicle independently from the operator so that the multirotor vehicle hovers in place to enable the operator to attach the harness to the frame. In such instances, the control system can be configured to adjust the position of rotor assembly based on a center of gravity of just the vehicle itself. In addition, the control system can be further configured with a flight control module. The flight control module can execute commands and/or pre-programmed routines and sub-routines to operate the multirotor vehicle along a desired path of travel. The module can receive inputs from sensors (e.g., accelerometers, gyroscopes, barometers, and cameras) that can be used to determine and/or make changes to a flight path of the vehicle.

In another example, the multirotor vehicle can include additional rotor assemblies to generate more thrust to operate the vehicle. For example, the vehicle can include additional rotor assemblies mounted near or at the waist of the operator and orientated in a horizontal direction so as to provide thrust to move the vehicle forward and backward. In some examples, the additional rotor assemblies can be positioned at a distance from the frame assembly so that they can help with steering or turning the vehicle to allow the operator to a desired facial direction. In some such cases, the propellers of the additional rotor assemblies can be manufactured from soft materials for safety (e.g., foam propellers for low thrust applications). The rotors of additional rotor assembly can also include vents to redirect the thrust. Note that in some examples a plurality of vents can be connected to a single additional rotor assembly to simultaneously provide thrust in multiple different directions.

The multirotor vehicle in some further embodiments can be a collapsible device so that the vehicle can be conveniently carried, transported or otherwise shipped. For example, the rotor assembly and frame extension can include foldable components (e.g., foldable propellers) that can be collapsed onto the frame assembly so that the assembly is the size of a backpack. In some such cases, the multirotor vehicle may include a plurality of servomotors to allow the vehicle to automatically or semi-automatically collapse into a folded configuration. To fold or otherwise reconfigure the multirotor vehicle the operator can initiate a program (or a routine/sub-routine) using an interface (e.g., smart phone or touch screen of the vehicle) to execute a fold command. Conversely, the operator can also unpackage or otherwise extend the multirotor vehicle from a packaged state to ready the vehicle for use by initiating a command using the interface.

In another embodiment, the multirotor vehicle can include a plurality of automated grippers to secure the operator to the vehicle. The grippers can be used in lieu of or in additional to the harness previously described herein. In some examples, the grippers can be located at one of several locations, such as at the operator's waist, chest, and/or shoulders. In such instances, the control system may include additional sensors (e.g., infrared sensors) that can be used to determine whether the operator is in a position in which the grippers can secure the operator to the vehicle.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

What is claimed is:

1. A multirotor vehicle comprising:
 a rotor assembly including a plurality of rotors, the rotor assembly configured and arranged to provide upward thrust;
 a frame pivotally attached to the rotor assembly and configured to extend below the rotor assembly and along a back of an operator, the frame including
  a frame extension including a first end and a second end, the first end pivotally attached to the rotor assembly, and
  a rigid frame body pivotally attached to the second end of the frame extension, so that the rotor assembly is offset from the rigid frame body;
 a first actuator configured to pivot the rotor assembly relative to a vertical axis of the rigid frame body so as to position the rotor assembly within a horizontal plane to allow at least a portion of thrust generated by the rotor assembly to lift the vehicle;
 a second actuator configured to pivot the rotor assembly relative to the horizontal plane so that at least a portion of thrust generated by the rotor assembly lifts the vehicle; and
 a harness connected to the frame and configured to secure the operator's torso to the multirotor vehicle with at least three points of contact between the rigid frame body and the operator's torso.

2. The multirotor vehicle of claim 1, wherein the multirotor vehicle is configured to aid the operator in one of walking, jumping, running, climbing, ascending, and descending terrain.

3. The multirotor vehicle of claim 1, wherein thrust generated by the plurality of rotors is in a substantially vertical direction to lift at least a portion of mass of the operator.

4. The multirotor vehicle of claim 1, wherein the first actuator is configured to rotate the frame extension from 135 degrees to 225 degrees relative to the vertical axis of the rigid frame body.

5. The multirotor vehicle of claim 1, wherein the second actuator is configured to rotate the rotor assembly between 35 degrees and 160 degrees relative to the horizontal plane.

6. The multirotor vehicle of claim 1, wherein the rotor assembly is attached to the frame along an axis coincident with a center gravity of the multirotor vehicle.

7. The multirotor vehicle of claim 1, wherein the plurality of rotors includes at least three or more rotors.

8. The multirotor vehicle of claim 1, wherein the plurality of rotors includes a first subgroup of rotors and a second subgroup of rotors, the first subgroup being positioned within a first horizontal plane, and the second subgroup positioned within a second horizontal plane different from the first horizontal plane.

9. The multirotor vehicle of claim 1, wherein the frame extension includes a curved frame body so that the first end of the frame extension is positioned vertically higher than the second end.

10. The multirotor vehicle of claim 1, wherein the multirotor vehicle is secured to the operator such that legs of the operator are unencumbered by the multirotor vehicle so that thrust from the vehicle aids in movement of the operator along ground terrain while using legs of the operator.

11. The multirotor vehicle of claim 1, wherein the frame is configured to extend from a lower back and along the torso of the operator to above a head of the operator.

12. The multirotor vehicle of claim 1 further comprising a control system configured to operate the plurality of rotors independently from one another to move the multirotor vehicle.

13. The multirotor vehicle of claim 12, wherein the control system further comprises at least one inertial measurement unit, the inertial measurement unit configured to measure roll, pitch, and yaw of the multirotor vehicle.

14. The multirotor vehicle of claim 1, wherein the rotor assembly is configured to provide at least 10 Kg of upward thrust.

15. A multirotor vehicle comprising:
a rotor assembly including a plurality of rotors, the rotor assembly configured and arranged to provide upward thrust;
a frame pivotally attached to the rotor assembly and configured to extend below the rotor assembly and along a back of an operator, the frame including
a frame extension including a first end and a second end, the first end pivotally attached to the rotor assembly, and
a rigid frame body pivotally attached to the second end of the frame extension, so that the rotor assembly is offset from the rigid frame body;
a first actuator configured to pivot the rotor assembly about a vertical axis of the rigid frame body so as to position the rotor assembly within a horizontal plane to allow a substantial portion of thrust generated by the rotor assembly to lift the vehicle;
a second actuator configured to pivot the rotor assembly about a horizontal axis so that a substantial portion of thrust generated by the rotor assembly lifts the vehicle;
an inertial sensor configured to measure changes in position of the multirotor vehicle, a processor communicatively coupled to the inertial sensor and configured to operate the first and second actuators to position of the rotor assembly to provide thrust in a direction normal to the horizontal plane in response to measurements of the inertial sensor; and
a harness connected to the frame and configured to secure the operator to the multirotor vehicle so that legs of the operator are unencumbered by the multirotor vehicle to allow the multirotor vehicle to aid in movement of the operator along ground terrain using legs of the operator.

16. The multirotor vehicle of claim 15, wherein the rotor assembly further includes at least one vent attached thereto, the at least one vent configured to change a direction of air flow from at least one rotor to generate thrust.

17. The multirotor vehicle of claim 15, wherein the rotors rotate independently from one another so that at least one rotor is configured to provide thrust predominantly in a horizontal direction and at least one other rotor is configured to provide thrust predominantly in a vertical direction.

18. The multirotor vehicle of claim 15, wherein one of the frame and rotor assembly includes a plurality of light sources to indicate one of direction, battery power, and operational mode of the multirotor vehicle.

19. The multirotor vehicle of claim 15 further comprising a control system, the control system including a first operational mode, the first operational mode configured to operate the multirotor vehicle independently from the operator so that the multirotor vehicle hovers in place to enable the operator to attach the harness to the frame.

20. The multirotor vehicle of claim 15, wherein each of the rotors is configured to provide at least 5 Kg of thrust.

* * * * *